(12) United States Patent
Chen et al.

(10) Patent No.: US 8,908,645 B2
(45) Date of Patent: Dec. 9, 2014

(54) METHOD AND SYSTEM FOR PROCESSING MEASUREMENT TASK IN CARRIER AGGREGATION SYSTEM

(75) Inventors: Zhongming Chen, Shenzhen (CN); Yada Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 13/635,428

(22) PCT Filed: Feb. 15, 2011

(86) PCT No.: PCT/CN2011/070999
§ 371 (c)(1),
(2), (4) Date: Sep. 16, 2012

(87) PCT Pub. No.: WO2011/150695
PCT Pub. Date: Aug. 12, 2011

(65) Prior Publication Data
US 2013/0010763 A1 Jan. 10, 2013

(30) Foreign Application Priority Data

Jun. 4, 2010 (CN) .......................... 2010 1 0194670

(51) Int. Cl.
*H04W 36/04* (2009.01)
(Continued)

(52) U.S. Cl.
CPC ............... *H04W 24/10* (2013.01); *H04L 5/001* (2013.01); *H04B 17/0077* (2013.01); *H04W 36/0094* (2013.01)
USPC .......................................... 370/331; 455/436

(58) Field of Classification Search
None
See application file for complete search history.

(56) References Cited

U.S. PATENT DOCUMENTS 8,644,224 B2 * 2/2014 Iwamura ....................... 370/328
(Continued)

FOREIGN PATENT DOCUMENTS

CN 1870806 A 11/2006
(Continued)

OTHER PUBLICATIONS

3GPP TSG-RAN WG2 Meeting #70, Montreal, Canada, Huawei, Measurement Configuration Handling upon PCC/SCC Change, May 2010.

(Continued)

*Primary Examiner* — Brian D Nguyen
*Assistant Examiner* — Roberta A Shand
(74) *Attorney, Agent, or Firm* — Oppedahl Patent Law Firm LLC

(57) ABSTRACT

The present disclosure discloses a method for processing a measurement task in a carrier aggregation system, which includes: deleting all measurement tasks related to a source Secondary Cell (Scell); or deleting a measurement task related to an Scell in a deleted source Scell; or doing not delete a measurement task related to the source Scell when a source Scell is reassigned to another frequency having a measurement object, and modifying a measurement object corresponding to the measurement task related to the source Scell to a measurement object of the reassigned frequency. When a source Pcell and a target Pcell are on different frequencies and the measurement object corresponding to the measurement task is a frequency on which there is the source Pcell when the frequency on which there is the target Pcell is the measurement object, the measurement object is modified to a measurement object of the frequency on which there is the target Pcell; and when the measurement object corresponding to the measurement task is the frequency on which there is the target Pcell, the measurement object is modified to a measurement object of the frequency on which there is the source Primary Cell (Pcell). The present disclosure further discloses a system for processing a measurement task in a carrier aggregation system. The present disclosure effectively decreases a configuration signaling of a measurement task and increases a utilization rate of the air interface resource.

12 Claims, 14 Drawing Sheets

(51) Int. Cl.
*H04W 24/10* (2009.01)
*H04L 5/00* (2006.01)
*H04B 17/00* (2006.01)
*H04W 36/00* (2009.01)

(56) References Cited

U.S. PATENT DOCUMENTS

| | | | |
|---|---|---|---|
| 2003/0051132 | A1 | 3/2003 | Kobayashi et al. |
| 2011/0103249 | A1* | 5/2011 | Kim et al. ............... 370/252 |
| 2012/0003943 | A1* | 1/2012 | Marinier et al. ............ 455/73 |
| 2013/0088983 | A1* | 4/2013 | Pragada et al. ............ 370/252 |
| 2014/0016520 | A1* | 1/2014 | Kim et al. ............... 370/280 |

FOREIGN PATENT DOCUMENTS

| | | |
|---|---|---|
| CN | 101674586 A | 3/2010 |
| CN | 101686472 A | 3/2010 |
| EP | 2190241 A1 | 5/2010 |
| RU | 2201040 C1 | 3/2003 |
| WO | 2007097673 A1 | 8/2007 |
| WO | 2009064930 A1 | 5/2009 |

OTHER PUBLICATIONS

3GPP TSG-RAN2 #70 Meeting, Montreal, Canada, Samsung, E-UTRA RRC support of CA measurements, May 2010.
3GPP TSG-RAN WG2 Meeting #70, Montreal, Canada, Qualcomm Incorporated, Measurement configuration model in CA, May 2010.
3GPP TSG-RAN WG2 Meeting #70bis, Stockholm, Sweden, ZTE, Clean-up of non-applicable measurements, Jun. 2010.
3GPP TSG-RAN WG2 Meeting #70bis, Stockholm, Sweden, Huawei, [70#12] LTE CA: Measurement Object Swapping, Jun. 2010.
3GPP TSG-RAN2 #70bis Meeting, Stockholm, Sweden, Samsung, RRC TP on CA changes regarding Measurement, Jun. 2010.
International Search Report in international application number: PCT/CN2011/070999, mailed on Jun. 2, 2011.
English Translation of the Written Opinion of the International Search Authority in international application number: PCT/CN2011/070999, mailed on Jun. 2, 2011.
Ericsson, ST-Ericsson, "Measurement events for carrier aggregation," 3GPP TSG-RAN WG2 #69, Tdoc R2-101197 Feb. 22, 2010. (7 pages - see entire document).
Supplementary European Search Report in European application number: 11789074.9, mailed on Sep. 23, 2013. (9 pages-see entire document).

* cited by examiner

Measurement task before handover or reconstruction

Measurement task after handover or reconstruction

Deletion unit 140

Fig. 18

Deletion unit 180

METHOD AND SYSTEM FOR PROCESSING MEASUREMENT TASK IN CARRIER AGGREGATION SYSTEM

TECHNICAL FIELD

The present disclosure relates to a measurement task processing technology, and particularly to a method and a system for processing a measurement task in a carrier aggregation system.

BACKGROUND

A Radio Resource Control (RRC) layer of a Long Term Evolution (LTE) system is mainly responsible for broadcast, paging, radio resource control, connection and management, radio carrier control, mobility management and terminal measurement report and control. When a RRC is carrying out the radio resource control, connection and management, a downlink RRC message sent by an eNB to a User Equipment (UE) is sent to the UE on a scheduled Physical Downlink Shared Channel (PDSCH) resource, after downlink PDSCH resource is dynamically scheduled through a PDSCH. In order to reduce the overhead of the PDSCH resource of the downlink RRC message, in the LTE system, the downlink RRC message is sent by means of delta signaling configuration, that is, after receiving the RRC message, on the basis of original configuration information, the UE adds, deletes or modifies part of the configuration according to the delta signaling to acquire a complete new configuration, and most of the unmodified configuration information can be sent without using an air interface, thus saving the air interface resource.

FIG. 1 is a flowchart showing a handover in an LTE system. As shown in FIG. 1, in the LTE system, after making a handover decision to carry out the handover, a source base station sends a handover request command to a target base station, through an X2 interface between the base stations or an S1 interface between the base stations and an Mobility Management Entity (MME), wherein context information of the UE in the source base station is carried in the command; after receiving the handover request command, the target base station sends the configuration information for the UE to the source base station through a handover request response command; after receiving the handover request response command, the source base station sends the configuration information for the UE from the target base station to the UE through a handover command; and after receiving the handover command, the UE accesses the target base station according to the configuration information in the command and sends a handover completion command to the target base station after accessing the target base station successfully. FIG. 2 is a flowchart showing a RRC reconstruction in an LTE system, as shown in FIG. 2, when determining to carry out the RRC reconstruction, the UE sends a RRC reconstruction request to a serving base station; after receiving the RRC reconstruction request, the serving base station sends a RRC reconstruction command to the UE; and the UE carries out the RRC reconstruction and returns a RRC reconstruction completion message to the base station after the RRC reconstruction is completed successfully; and the base station will generally carry out a RRC reassignment process again after the RRC reconstruction is completed.

In a connected state, a specific process of the measurement is that: a network side sends a measurement control message to a UE, wherein the measurement control message contains a measurement identity, a measurement object, a report configuration and other measurement-related attribute, and the measurement identity associates the measurement object with the report configuration to form a complete measurement task. The measurement object contains the attributes (for example carrier frequency, a list of neighboring cells and the like) of the measurement object, only one measurement object may be configured by each carrier frequency; and the report configuration contains the attributes (for example event triggering or periodic report, definition on a triggered event (A1, A2 . . . ), times reporting and the like) of the report configuration. The UE carries out a measurement and an evaluation according to the measurement object and the report configuration contained in the measurement control message, generates a measurement report according to a result of the measurement, and reports the measurement report to the network side.

In order to reduce the overhead of the handover and the RRC signaling reassignment after the RRC is reconstructed, the UE carries out the following processing (hereinafter referred to as a measurement task processing) regarding to the measurement task during the process of a pilot frequency handover or reconstruction: when a Measurement Object (MO) configured by a serving cell (a cell before the handover or reconstruction, referred to as a source side) for a UE contains the carrier frequency of a target cell (a cell after the handover or reconstruction, referred to as a target side), the UE processes the measurement object of the carrier frequency on which there is the serving cell and the measurement object of the carrier frequency on which there is the target cell, that is, a measurement identity corresponding to the measurement object of the carrier frequency on which there is the source serving cell, is corresponded to the measurement object of the carrier frequency on which there is the target cell after the measurement task processing is performed and a measurement identity corresponding to the measurement object of the frequency carrier on which there is the target cell is corresponded to the measurement object of the carrier frequency on which there is the source serving cell after the measurement task processing is performed, as shown in FIG. 3, otherwise, the measurement task corresponding to the measurement object of the carrier frequency on which there is the source serving cell is deleted. FIG. 3 is a flowchart showing a measurement task processing in an LTE system, and as shown in FIG. 3, the process of the measurement task processing is specifically as follows: the carrier frequency on which there is a source cell (i.e. the serving cell shown in FIG. 3) has two measurement tasks which are MID#0 (MO#0+RC#0) and MID#1 (MO#0+RC#1) respectively, and the carrier frequency on which there is a target cell (i.e. the target cell shown in FIG. 3) has one measurement task that is MID#2 (MO#1+RC#2). The process is as follows: the two measurement tasks MID#0 and MID#1 of the MO#0 are correspond to the MO#1, i.e. a new MID#0 (MO#1+RC#0) and a new MID#1 (MO#1+RC#1); and the measurement task MID#1 of the MO#1 is correspond to the MO#0, i.e., a new MID#2 (MO#0+RC#2).

The process of the measurement task processing is briefly described by taking the handover as an example. The measurement task configuration information of the UE in the source base station is carried in the handover request command sent from the source base station to the target base station, after receiving the handover request command, the target base station carries out the above-mentioned measurement task processing if the handover request is the pilot frequency handover, and then configures a new measurement task (which is completed through a delta signaling) for the UE based on the processed measurement task, wherein the new measurement task is contained in a handover request response command to be forwarded to the UE through the source base station; after receiving the handover command, the UE carries out the measurement task processing first and then carries out the new measurement task contained in the delta signaling configured by the target base station. In this way, the final measurement tasks of the UE and the target base station are consistent, moreover, as the new measurement task configured by the target base station for the UE is just a delta signaling, the air interface resource can be saved.

In order to provide a higher data rate to a mobile user, a Long Term Evolution Advance (LTE-A) system has proposed a Carrier Aggregation (CA) technology, the purpose of which is to provide a wider wideband for the UE with a corresponding capability to increase the peak rate of the UE. In the LTE system, a maximum downlink transmission bandwidth supported by the system is 20 MHz, while the CA technology aggregates two or more Component Carriers (CC) so as to support a transmission bandwidth of larger than 20 MHz but no more than 100 MHz. The UE of the LTE-A system with the CA capability can send and receive data at a plurality of CCs synchronously, and if it is not noted specially, the UE described hereinafter refers to the UE of the LTE-A system. In the LTE-A system, a UE in a connected state can communicate with a source base station by means of a plurality of CCs (e.g., CC1, CC2) synchronously and specifically identify a carrier by means of a component carrier identity such as a CC ID. The base station designates a Primary Component Carrier (PCC) for the UE through an explicit configuration or according to a protocol agreement, and other component carriers are referred to as a Secondary Component Carriers (SCC); and the serving cell on the PCC is referred to as a Primary Cell (Pcell) and the serving cell on the SCC is referred to as a Secondary Cell (Scell). Non Access Stratum (NAS) information (e.g., such information as Cell Global Identification (ECGI), Tracking Area Identity (TAI) and the like) is acquired by the Pcell; and if a Radio Link Failure (RLF) occurs in a downlink Pcell, the UE needs to carry out the RRC reconstruction. After the UE in the idle state accesses a network and enters into the connected state, the accessed cell is the Pcell. When the UE is in the connected state, a network side can complete the transition of a Pcell through the RRC reassignment or an intra-cell handover, or the network side designates the Pcell during the process of informing the UE to carry out a handover. Thus, a carrier aggregation serving cell and a carrier aggregation neighboring cell may both contain a plurality of carriers, and there is uncertainty in the principle of the measurement task processing in the LTE system, however, no solution has been recorded in the current standards or proposals as to solve this problem. This uncertainty may cause that a difference exists between the measurement task configuration performed by the target base station and the measurement task configuration understood by the UE, thereby causing chaos during the measurement process, so that the base station side fails to acquire a complete measurement result, causing system resource waste as the UE side performs an error measurement process.

Defined measurement events in the LTE system are: an event A1 (the signal quality of the serving cell is higher than a designated threshold), an event A2 (the signal quality of the serving cell is lower than a designated threshold), an event A3 (the signal quality of the neighboring cell is a designated offset higher than that of the serving cell), an event A4 (the signal quality of the neighboring cell is higher than a designated threshold), and an event A5 (the signal quality of the serving cell is lower than a designated threshold 1, and the signal quality of the neighboring cell is higher than a designated threshold 2); wherein the event A4 is unrelated to the serving cell, therefore, the definition on the event A4 is unchanged in the LTE-A system. The events A1 and A2 are measurement events aiming at one serving cell; therefore, in the LTE-A system, each serving cell (Pcell or Scell) has a measurement task of the event 1 and the event 2; the events A3 and A5 may have the two following types: a co-frequency event A3 (or referred to as an A3-SCC) or an event A3/A5. The co-frequency event A3 is defined as follows: the frequency of the measurement object is the frequency on which there is a configured component carrier (PCC and/or SCC), a reference cell is an Scell or Pcell on the frequency of a corresponding measurement object, and the signal quality of a neighboring cell is a designated offset higher than that of the serving cell that has the same frequency point as the neighboring cell; and the event A3 is defined as follows: the frequency of the measurement object refers to all frequencies (including the frequencies at which a PCC and an SCC are operating), the reference cell is a Pcell, and the signal quality of the neighboring cell (if the Scell is on the frequency of the measurement object, then the Scell is treated as the neighboring cell) is a designated offset higher than that of the Pcell. Similar to the co-frequency event A3, a co-frequency event A5 is defined as follows: the frequency of the measurement object is the frequency on which there is the configured component carrier (PCC and/or SCC), the reference cell is an Scell or Pcell on the frequency of the corresponding measurement object, the signal quality of the serving cell is lower than the designated threshold 1, and the signal quality of the neighboring cell is higher than the designated threshold 2; similar to the event A3, the event A5 is defined as follows: the frequency of the measurement object refers to all frequencies (including the frequencies on which there are a PCC and an SCC), the reference cell is the Pcell, the signal quality of the serving cell is lower than the designated threshold 1, and the signal quality of the neighboring cell (if an Scell is on the frequency of the measurement object, then the Scell is treated as the neighboring cell) is higher than the designated threshold 2.

As there may be a plurality of serving cells (only one Pcell, or one Pcell and one or more Scells) in the LTE-A system, the measurement task handover method cannot be used by a single serving cell in an LTE system during the process of a handover or reconstruction.

SUMMARY

In view of this, the main purpose of the present disclosure is to provide a method and a system for processing a measurement task in a carrier aggregation system, so as to enable a UE to process a measurement task at a target side and a source side timely and quickly.

In order to achieve the purpose above, the technical solution of the present disclosure is realized as follows.

A method for processing a measurement task in a carrier aggregation system may include:
an operation of the measurement task related to an Scell:
(1) deleting each measurement task related to the Scell, or
(2) if an original Scell is deleted deleting the measurement task related to the original Scell, and modifying, if the original Scell is reassigned to another frequency on which there is a measurement object, the measurement object corresponding to the measurement task related to the original Scell to the measurement object of the reassigned target frequency; otherwise, deleting the measurement task related to the Scell, wherein the deletion and the reassignment take an identity (ID) of the Scell as an identity; or (3) for a certain original Scell, deleting the measurement task related to the certain original Scell if a new Scell is on the same frequency as a frequency on which said certain original Scell is not found after a configuration, and keeping the measurement task related to the Scell in other scene.

The processing of the measurement task related to a non-Scell may be carried out in the following way:

(1) carrying out the measurement task processing for a Pcell-related measurement task and keeping the measurement task related to a non-serving cell; or (2) uniformly carrying out the measurement task processing related to the non-Scell;

the measurement task processing above may specifically includes that: modifying, when the measurement object configured by the source base station for an UE contains the carrier frequency of a new Pcell and when the measurement object related to the measurement task is the frequency on which there is a target Pcell, if the original Pcell and the new Pcell are on different frequencies, a corresponding measurement object to the measurement object of the frequency on which there is the new Pcell; and modifying, when the measurement object related to the measurement task is the frequency on which there is the source Pcell, the measurement object to a measurement object of the frequency on which there is the new Pcell; otherwise, deleting the measurement task corresponding to the frequency on which there is the source Pcell.

Wherein, the measurement task related to the above serving cell (Pcell or Scell) may be defined as follows:

the measurement task related to the serving cell may be a measurement report which is required to carry the measurement quantity of the serving cell when being reported; when the serving cell participates in the triggering of a measurement task event, for example, when parameters serving as a triggering condition of the measurement event (including an entering condition or a leave condition) include the measurement quantity of the serving cell, the existing measurement events are classified into two types of events: the measurement task reflecting the measurement result of the serving cell, and the measurement task reflecting the measurement results of the serving cell and the neighboring cell.

1) when the serving cell participates in the triggering of the measurement task event, the measurement task reflecting the measurement result of the serving cell reports the measurement report when the measurement result of the serving cell meets a condition, which refers, for example, to a condition that the measurement result of the serving cell is higher than or be lower than a threshold; the specific measurement configuration may be a measurement task which takes the frequency on which there is the serving cell as the measurement object and takes the event A1 and A2 as a report configuration.

2) when the serving cell participates in the triggering of the measurement task event, the measurement task reflecting the measurement results of the serving cell and the neighboring cell is a measurement task which reports a measurement report when the measurement results of the serving cell and the neighboring cell meet a condition and/or when the measurement result of the neighboring cell meets a condition.

2.1) the condition for reporting of the measurement report when the measurement results of the serving cell and the neighboring cell meet the condition may be either a condition that is met by a relative size of the measurement result of the neighboring cell with respect to the measurement result of the serving cell, or a condition which is respectively met by the measurement result of the neighboring cell and the measurement result of the serving cell.

2.1.1) the former may refer to that the measurement result of the neighboring cell is an offset higher or lower than that of the serving cell, for example, a measurement task of which the specific configured measurement object is the frequency on which there is the neighboring cell and of which the report configuration is the event A3 or the event A3-SCC.

2.1.2) the latter may refer to that the measurement result of the neighboring cell is higher than a threshold 1 while the measurement result of the serving cell is lower than a threshold 2, for example, a measurement task of which the specific configured measurement object is the frequency on which there is the neighboring cell and of which the report configuration is the event A5 or the event A5-SCC.

3) when the serving cell does not participate in the triggering of the measurement task event, a condition for reporting the measurement task carrying the measurement result of the serving cell when the measurement result of the neighboring cell meets the condition is that the measurement result of the neighboring cell is higher or lower than a threshold, for example, a specific configuration may be a measurement task, which is associated with the corresponding serving cell, of which the measurement object is the frequency on which there is the neighboring cell and of which the report configuration is that the measurement result of the neighboring cell is higher (e.g., an event A4) or lower than a threshold, and the measurement report carrying the measurement result of the corresponding serving cell is reported when the neighboring cell meets the condition.

Preferably, the method may further include:

keeping a measurement task of which the measurement object is the carrier frequency exclusive of the primary carrier frequency and the secondary carrier frequency when the measurement task of which the measurement object is a carrier frequency exclusive of the primary carrier frequency and the secondary carrier frequency is existed.

Preferably, the steps of keeping a measurement task of which the measurement object is the carrier frequency exclusive of the primary carrier frequency and the secondary carrier frequency specifically when the measurement task of which measurement object is a carrier frequency exclusive of the primary carrier frequency and the secondary carrier frequency is existed may specifically include:

for the secondary carrier frequency which is the same as the frequency on which there are the source side Scell and the target side Scell, keeping the measurement task of which the measurement object is said secondary carrier frequency; and for the secondary carrier frequency which is different from the frequency on which there are the source side Scell and the target side Scell, keeping the measurement task related to the Pcell in the measurement tasks on said secondary carrier frequency.

A method for processing a measurement task in a carrier aggregation system may include:

deleting a measurement task for which a measurement object is a carrier frequency on which there is a source side Scell and/or a target side Scell; or keeping, for secondary carrier frequencies on which there are the source side Scell and the target side Scell, a measurement task for which a measurement object is said secondary carrier frequency. Specifically, the method may include:

deleting the measurement task for which the measurement object is the carrier frequency on which there is the source side Scell or the target side Scell; or for the secondary carrier frequencies on which there are the source side Scell and the target side Scell, keeping the measurement task for which the measurement object is the secondary carrier frequency and deleting the measurement task for which the measurement object is the carrier frequency on which there is other source side Scell or other target side Scell.

When a source Pcell and a target Pcell are on different frequencies and the frequency on which there is the target Pcell is the measurement object, for the measurement task for which the measurement object is the carrier frequency on which there is the source side Pcell, the measurement object is modified to a measurement object of the frequency on which there is the target Pcell, and for a measurement task for which the measurement object is the carrier frequency on which there is the target Pcell, the measurement object is modified to a measurement object of the frequency on which there is the source Pcell.

The above two steps should be executed in sequence. Other measurement task except the aforementioned measurement tasks is kept.

A system for processing a measurement task in a carrier aggregation system may include:

a deletion unit, configured to delete all measurement tasks related to a source Scell; or to delete a measurement task related to an Scell in a deleted source Scell.

Preferably, the system may further include a reassignment unit and a modification unit, wherein the reassignment unit is configured to reassign the source Scell to another frequency on which there is a measurement object; the deletion unit does not delete the measurement task related to the reassigned source Scell; and the modification unit is configured to modify the measurement object corresponding to the measurement task related to the source Scell to the measurement object of the reassigned frequency.

Preferably, the process in which the source Scell is deleted may include that:

after the configuration, there is not a new Scell on the same frequency as a frequency on which there is the deleted source Scell; or there is not a carrier identity corresponding to a source Scell.

Preferably, the process in which the source Scell is reassigned to the another frequency on which there is the measurement object may include that:

the carrier identity of the source Scell is unchanged and the frequency of the source Scell is changed.

Preferably, the modification unit may be further configured to: modify, when the measurement object configured by the source base station for an UE contains a carrier frequency of a new Pcell and the measurement object related to the measurement task is a frequency on which there is a target Pcell, a corresponding measurement object to a measurement object of the frequency on which there is a new Pcell; and modify the measurement object to the measurement object of the frequency on which there is the new Pcell when the measurement object related to the measurement task is the carrier frequency on which there is a source Pcell; otherwise, delete the measurement task corresponding to the frequency on which there is the source Pcell; wherein the source Pcell and the target Pcell are on different frequencies.

Preferably, the system may further include:

a reservation unit, configured to, when there is a measurement task for which the measurement object is a carrier frequency exclusive of the source primary carrier frequency and the secondary carrier frequency, keep the measurement task.

A system for processing a measurement task in a carrier aggregation system may include a deletion unit, a reservation unit and a modification unit, wherein the deletion unit is configured to delete a measurement task for which a measurement object is a frequency on which there is a source side Scell and/or a target side Scell;

the reservation unit is configured to keep, for the secondary carrier frequency which is the same as the frequency on which there are the source side Scell and the target side Scell, the measurement task for which the measurement object is the secondary carrier frequency; and the modification unit is configured to modify, when a frequency on which there is a Pcell is a measurement object, the measurement object to a measurement object of the frequency on which there is the target Pcell for the measurement task for which the measurement object is the carrier frequency on which there is the source side Pcell, and modify the measurement object to a measurement object of the frequency on which there is a source Pcell for the measurement task for which the measurement object is the carrier frequency on which there is the target Pcell; wherein the source Pcell and the target Pcell are on different frequencies.

A system for processing a measurement task in a carrier aggregation system may include:

a deletion unit configured to, when a Scell is deleted, delete a measurement task related to the Scell, or delete a measurement task for which a measurement object is a carrier frequency on which there is the Scell.

In the present disclosure, by means of setting a rule for the measurement task processing of a source side and a target side, the problem of uncertainty in the measurement task processing which exists in a carrier aggregation system during the process of the handover or the reconstruction is solved, moreover, a configuration signaling for the measurement task is effectively decreased, an utilization rate of air interface resource is improved, and good service experience is provided to the user.

BRIEF DESCRIPTION OF THE DRAWINGS

FIG. 18 is a structural diagram of a system for processing a measurement task in a carrier aggregation system according to embodiment 5 of the present disclosure.

DETAILED DESCRIPTION

Figure 1:
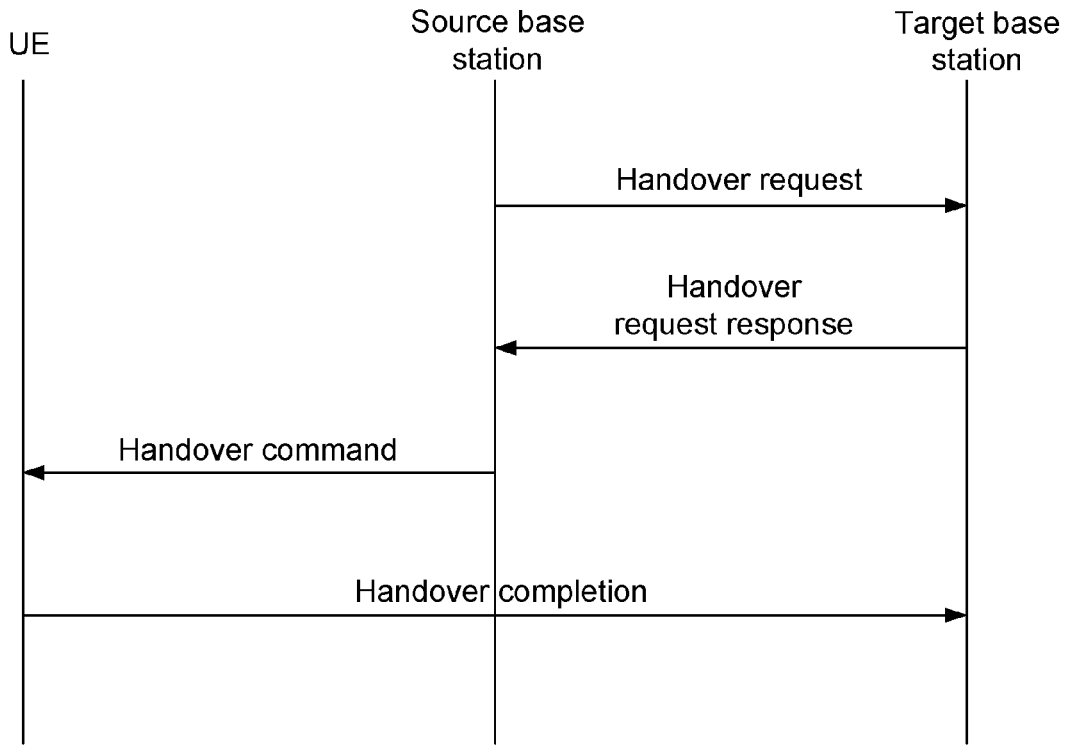
FIG. 1 is a flowchart showing a handover in an LTE system.
Figure 2:
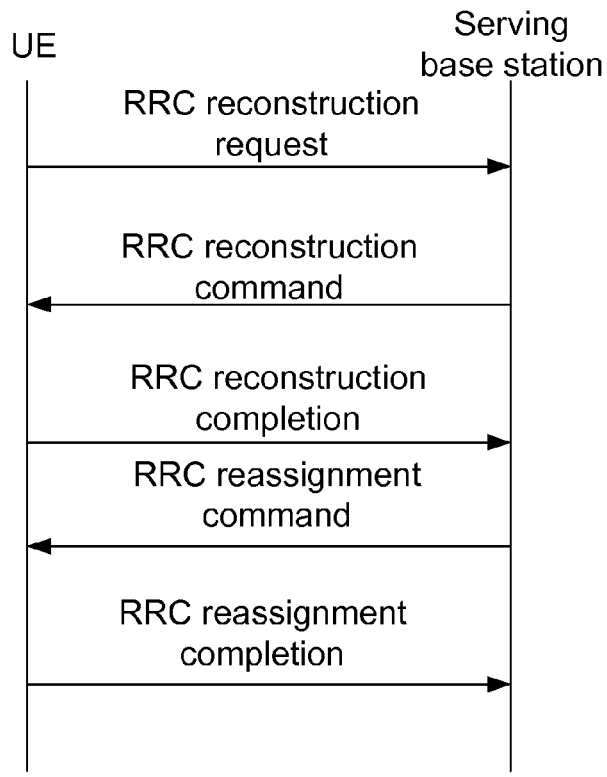
FIG. 2 is a flowchart showing a RRC reconstruction in an LTE system.
Figure 3:
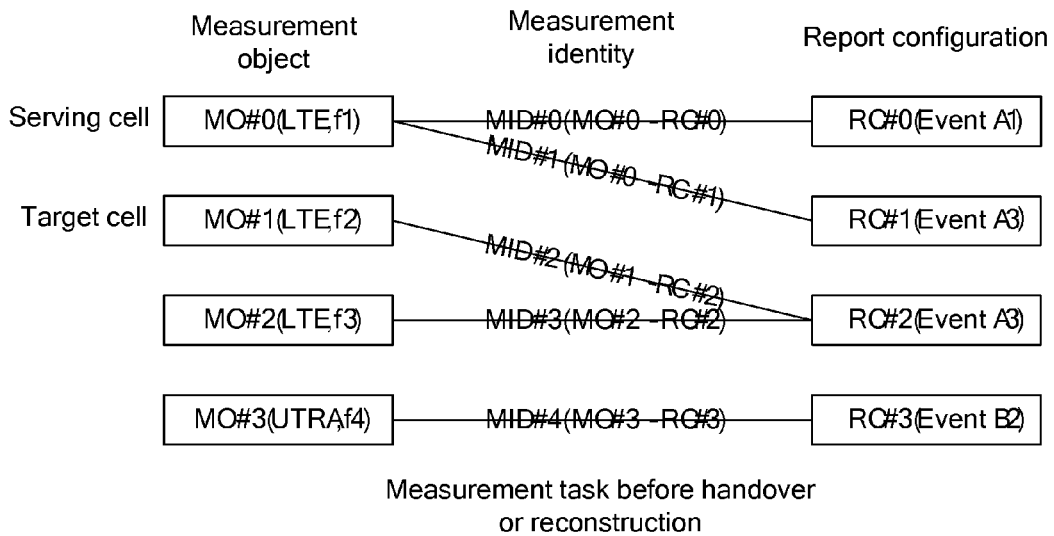
FIG. 3 is a flowchart showing a process of a measurement task processing in an LTE system.
Figure 3:
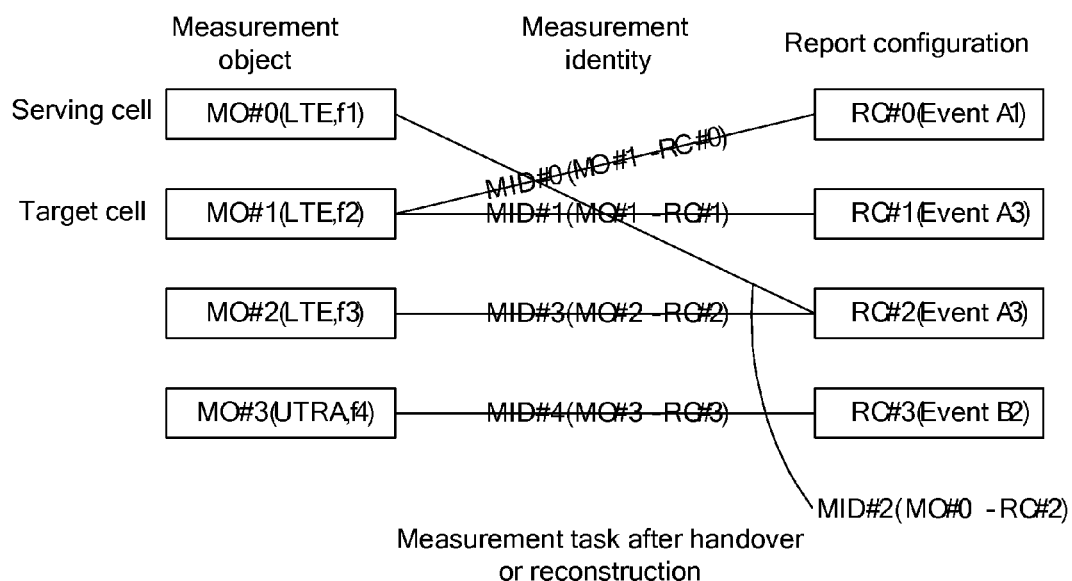

The basic idea of the present disclosure is that, during a handover, a reconstruction or a reassignment, an operation of a measurement task related to an Scell includes: all measurement tasks related to a source serving cell Scell are deleted; or the measurement task related to an Scell in a deleted source Scell is deleted; or when a source Scell is reassigned to another frequency on which there is a measurement object, the measurement task related to the source Scell is not deleted, instead a measurement object corresponding to the measurement task related to the source Scell is modified to a measurement object of the reassigned frequency, otherwise the measurement task related to the Scell is deleted; and an operation of a measurement task related to a non-Scell includes: when a source Pcell and a target Pcell are on different frequencies and a frequency on which there is the target Pcell is a measurement object, the measurement object is modified to the measurement object of the frequency on which there is the target Pcell if the measurement object corresponding to the measurement task related to the Pcell is the frequency on which there is the source Pcell; and the measurement object is modified to a measurement object of the frequency on which there is the source Pcell if the measurement object corresponding to the measurement task is the frequency on which there is the target Pcell.

Wherein, the measurement task related to the Scell is defined as follows:

the measurement task related to the Scell is the measurement task reflecting a measurement result of the Scell or measurement results of the Scell and a neighboring cell; wherein the measurement task reflecting the measurement result of the Scell reports a measurement report when the measurement result of the Scell meets a condition which refers, for example, to a condition that the measurement result of the serving cell is higher or lower than a threshold; here, the serving cell is the Scell, and the specific measurement configuration may be that the frequency on which there is the Scell is taken as the measurement object and event A1 and A2 is taken as the measurement task of the report configuration; wherein, the measurement task reflecting the measurement results of the Scell and the neighboring cell reports the measurement report when the measurement results of the Scell and the neighboring cell meet a condition and/or reports the measurement task in which the measurement result of the Scell is required to be carried when the measurement result of the neighboring cell meets a condition; the condition for reporting the measurement report when the measurement results of the Scell and the neighboring cell meet the condition may be either a condition met by a relative size between the measurement result of the neighboring cell and the measurement result of the Scell, or a condition which is respectively met by the measurement result of the neighboring cell and the measurement result of the Scell; wherein in the former condition the measurement result of the neighboring cell is an offset higher or lower than the measurement result of the serving cell, for example, the specific configuration may be that in the case of a co-frequency event the measurement object is the frequency on which there is the neighboring cell (i.e., the Scell) and the report configuration is the measurement task of the co-frequency event A3 or A3-SCC, and in the latter condition the measurement result of the neighboring cell is higher than a threshold 1 while the measurement result of the Scell is lower than a threshold 2, for example, the specific configuration may be that in the case of the co-frequency event the measurement object is the frequency on which there is the neighboring cell (i.e., the Scell) and the report configuration is the measurement task of the co-frequency event A5 or A5-SCC; the condition for reporting the measurement task in which the measurement result of the Scell is to be carried when the measurement result of the neighboring cell meets the condition is that the measurement result of the neighboring cell is higher or lower than a threshold, for example, the specific configuration may be that the measurement object is the frequency on which there is the neighboring cell (i.e. Scell) and the report configuration is that the measurement result of the neighboring cell is higher than a threshold (e.g., an event A4), while a measurement result of the corresponding Scell is associated, and the measurement report in which the measurement result corresponding Scell is carried is reported when the condition is met by the neighboring cell.

A measurement task related to a non-Scell may be defined in the following two ways:

definition 1 is a measurement task reflecting the measurement result of the Pcell or the measurement result of the Pcell and the neighboring cell; wherein the specific definition is identical to the above definition related to the Scell; and definition 2 is other measurement task other than the measurement task related to the Scell.

In order to make the purpose, the technical solution and the advantages of the present disclosure more clear and apparent, the present disclosure will be further described in detail with reference to embodiments in conjunction with the accompanying drawings hereinafter.

During the handover, reconstruction or reassignment, a rule for the measurement task processing set in the present disclosure includes:

the operation of the measurement task related to the Scell is that: all measurement tasks related to the source serving cell Scell are deleted; or the measurement task related to the Scell in the deleted source Scell is deleted; or when the source Scell is reassigned to another frequency on which there is a measurement object, the measurement task related to the source Scell is not deleted but the measurement object corresponding to the measurement task related to the source Scell is modified to the measurement object of the reassigned frequency, otherwise the measurement task related to the Scell is deleted; and the operation of the measurement task related to the non-Scell is that: when a source Pcell and a target Pcell belong to different frequencies and the frequency on which there is the target Pcell is a measurement object, in the case of the measurement task related to the Pcell, the measurement object is modified to a measurement object of the frequency on which there is the target Pcell if the measurement object corresponding to the measurement task is the frequency on which there is the source Pcell, and the measurement object is modified to the measurement object of the frequency on which there is the source Pcell if the measurement object corresponding to the measurement task is the frequency on which there is the target Pcell.

For the sake of a uniform description, in the present disclosure, in the case of handover, a handover from a source side cell to a target side cell is performed; in the case of reconstruction, the source side is a cell in which the UE locates before reconstruction, and the target side is a cell in which the UE locates after reconstruction; and in the case of reassignment, the source side is a cell in which the UE locates before reconstruction, and the target side is a cell in which the UE locates after reconstruction.

Embodiment 1

Figure 4:
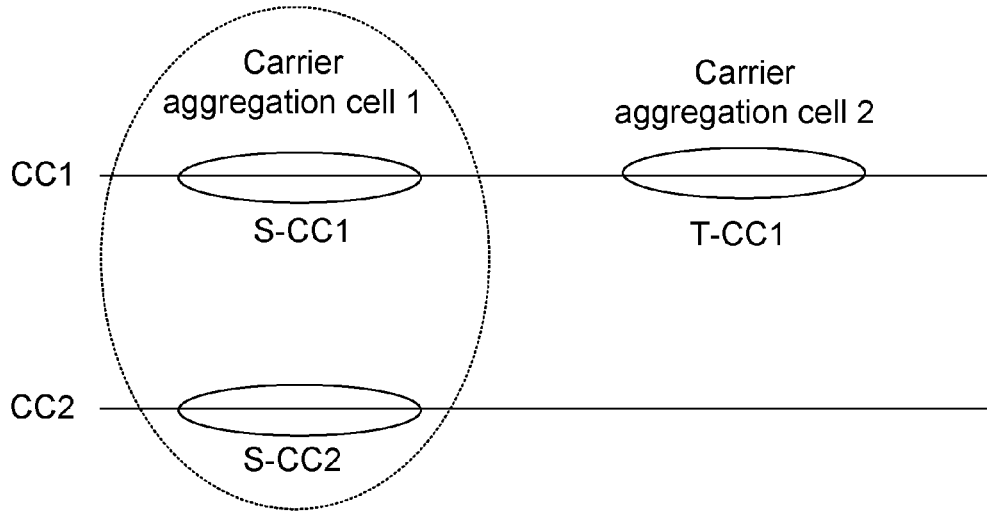
FIG. 4 is a schematic diagram showing a handover of an UE from a cell 1 to a cell 2 according to the present disclosure.
Figure 5A:
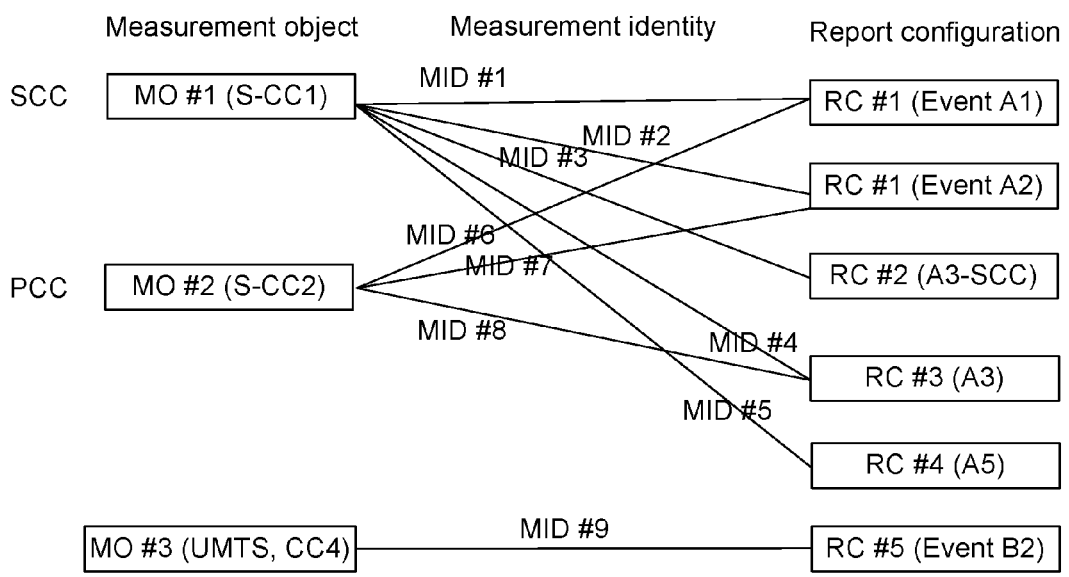
FIG. 5a is a schematic diagram showing a process of a measurement task processing before the handover shown in FIG. 4 according to the present disclosure.

FIG. 4 is a schematic diagram showing a handover of an UE from a cell 1 to a cell 2 according to the present disclosure; as shown in FIG. 4, the UE resides on a CC2, initiates the establishment of a RRC connection in the CC2, accesses a carrier aggregation cell 1 after finishing the establishment of the RRC connection and then enters into a connected state, in this way, according to the rule relevant to the carrier aggregation system, the CC2 is a PCC and the serving cell in the CC2 is a Pcell. Due to the demand on services, a network side configures a CC1 for the UE to carry out the carrier aggregation, therefore, currently the component carriers synchronously used by the UE are the CC1 and the CC2, wherein the CC2 is the PCC, the CC1 is the SCC, and the Scell is the serving cell in the CC1. FIG. 5a is a schematic diagram showing a process of a measurement task processing before the handover shown in FIG. 4 according to the present disclosure, as shown in FIG. 5a, the content of the measurement task before the handover includes: MID#1/2/3, wherein the carrier frequency of the measurement object is CC1 (i.e., the carrier frequency on which there is the SCC), and the measurement event is A1/A2/co-frequency A3 of which the triggering condition are respectively that the Scell is higher than a threshold or the Scell is lower than a threshold or a neighboring cell is an offset higher than the Scell and which are Scell-related measurement tasks; MID#6/7/8, wherein the carrier frequency of the measurement object is the CC2 (i.e. a carrier frequency on which there is the PCC), and the measurement event is A1/A2/A3 of which the triggering condition are respectively that the Pcell is higher than a threshold or the Pcell is lower than a threshold or a neighboring cell is an offset higher than the Pcell and which are therefore Pcell-related measurement tasks; MID#9, wherein the carrier frequency of the measurement object is the CC4 of a UMTS, the measurement event is a B2 event of which the triggering condition is that the Pcell is lower than a threshold 1 and a neighboring cell is higher than a threshold 2 and which is also the Pcell-related measurement task; and MID#4/5, wherein the carrier frequency of the measurement object is a CC1 (i.e., the carrier frequency on which there is the SCC), the measurement event is A3/A4, wherein the triggering condition of the event A3 is that a cell in the SCC is an offset higher than the Pcell the event A3 is the Pcell-related measurement task, and the event A4 is required to report the signal quality of the Pcell after being triggered, therefore, the event A4 is also the Pcell-related measurement task. All of the aforementioned 'higher', 'lower' and 'offset' comparisons take the measurement quantity of the cell as a reference value.

When the UE moves towards a carrier aggregation cell 2, the source base station makes a judgment of handover to the target base station and switches the UE into the carrier aggregation cell 2. The handover request message sent by the source base station to the target base station contains the measurement task of the UE in the source base station, and may further contain information on the carriers currently used by the UE, such as the information of the CC1 and the CC2, the CC2 being the PCC and the like.

Figure 5B:
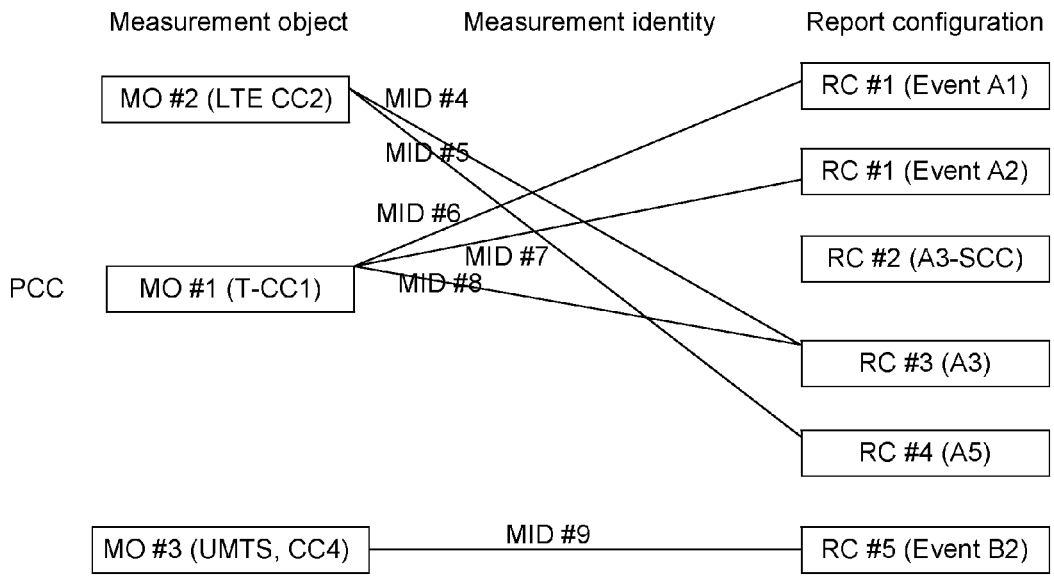
FIG. 5b is a schematic diagram showing a process of a measurement task processing during the handover shown in FIG. 4 according to the present disclosure.

FIG. 5b is a schematic diagram showing a process of a measurement task processing during the process of the handover shown in FIG. 4 according to the present disclosure, as shown in FIG. 5b, after receiving the handover request message from the source base station, the target base station determines that the carrier aggregation cell 2 only uses the CC1 which is the PCC, and the Pcell is the serving cell at the CC1, that is, the Scell at the CC1 is deleted; the process of the measurement task processing related to the Scell is as follows: (1) the measurement tasks (MID#1-3) related to the deleted Scell in the source side is deleted, specifically, the corresponding MID is deleted; or (2) in the case of the Scell being operating the measurement tasks related to these Scells may be deleted together. As there is only one Scell in this embodiment, the process is identical.

If the process above occurs in one base station, then there is no need to send a handover request message, however, the internal processing process is the same.

In the case that an S-Pcell (a source side Pcell) and a T-Pcell (a target side Pcell) are operating on different frequencies and the measurement object is the frequency (CC1) on which there is the target Pcell, the following processing is carried out for all measurement tasks (MID#4-9): for a measurement object corresponding to the measurement task (e.g., MID#6/7/8) which is the frequency (CC2) on which there is the S-Pcell, modifying the measurement object to a measurement object (MO#2) of the frequency on which there is the T-Pcell; and for a measurement object corresponding to the measurement task (e.g., MID#4/5) which is the frequency (CC1) on which there is the T-Pcell, modifying the measurement object to a measurement object (MO#1) of the frequency on which there is the S-Pcell. And other measurement task, such as the measurement task (MID#9) of the CC4, is kept.

According to the result of the measurement processing shown in FIG. 5b, the target base station configures, for the UE, a delta signaling of a measurement task, for example, adding a measurement task MID#1 (A5 on the CC1), and sends the delta signaling to the source base station through a handover request response message; and after receiving it, the source base station sends it to the UE through a handover command. By using the handover command, the source base station may further inform the UE to delete the Scell at the CC1.

After receiving the handover command, the UE deletes the Scell and all existing Scell by oneself if the handover command does not indicate deletion of the Scell on the CC1 and may delete the measurement tasks related to these Scells together if they exist. If the handover command indicates the deletion of the Scell on the CC1, then the UE deletes the Scell and the measurement tasks (MID#1/2/3) related to the Scell on the CC1 after receiving the handover command.

Figure 5C:
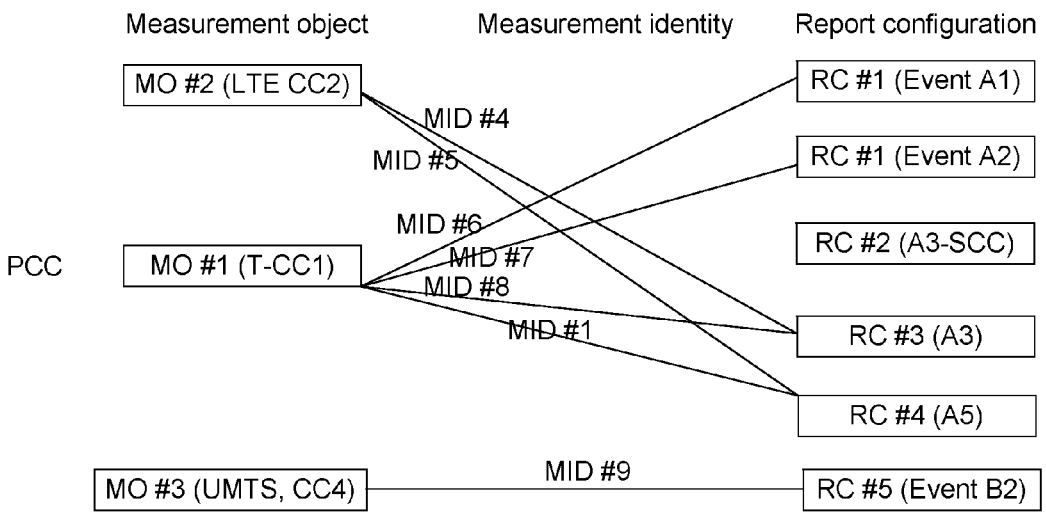
FIG. 5c is a schematic diagram showing a process of a measurement task processing after the handover shown in FIG. 4 according to the present disclosure.

After completing the measurement task processing by adopting the same operation as that the base station performs above first, and then modifying the measurement configuration according to the delta signaling in the received handover command, the final measurement task result is shown in FIG. 5c.

The UE carries out the measurement according to the current measurement task configuration and reports the measurement report to the network side as required, and the network side makes a related decision according to the measurement report.

In the process above, if the source base station determines the handover of the UE to the CC3 of the target base station, or the target base station determines to configure the CC3 for the UE as a Pcell, then the measurement task (MID#1-3) related to the deleted Scell at the source side is deleted. In the case that the S-Pcell (source side Pcell) and the T-Pcell (target side Pcell) are on different frequencies, but there is not the measurement object which is the frequency (CC3) on which there is the target Pcell, the following processing is carried out for all measurement tasks (MID#4-9): deleting the measurement tasks (e.g., MID#6/7/8) corresponding to a measurement object which is the frequency (CC2) on which there is the S-Pcell, and keeping the other measurement task such as the measurement task (MID#9) of the CC4. According to the measurement result above, the target base station configures, for the UE, the delta signaling of the measurement task, for example, adding the measurement object (MO#4=CC3) and synchronously adding the measurement task (MID#1/2/3) of the event A1/A2/A3 at MO#4, and sends the delta signaling to the source base station through the handover request response message; and after receiving it, the source base station sends it to the UE through the handover command. After completing the measurement task processing by adopting the same operation as that the base station performs above first, and then modifying the measurement configuration according to the delta signaling in the received handover command, the final measurement task result is the same as that of the target base station.

Embodiment 2

Figure 6:
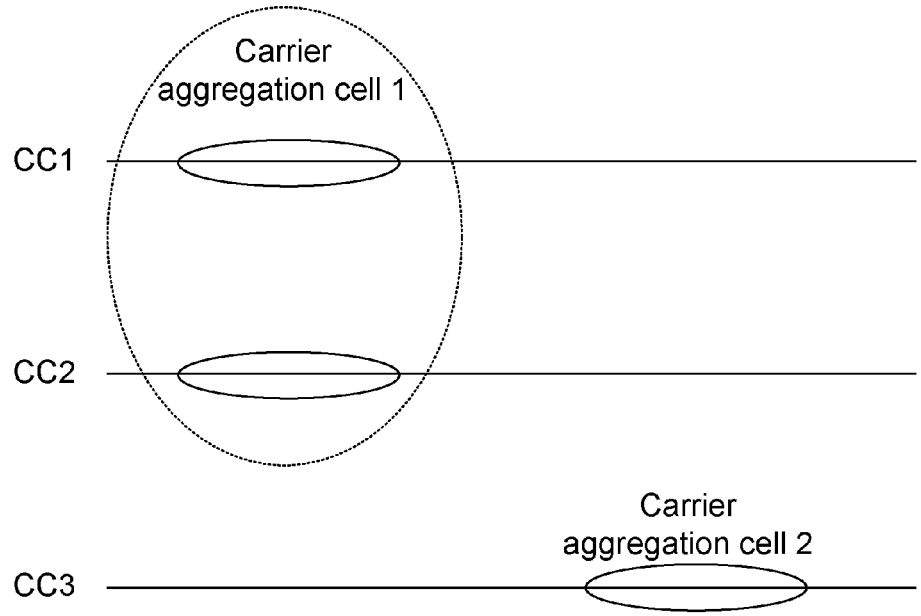
FIG. 6 is a schematic diagram showing a reconstruction of an UE from a cell 1 to a cell 2 according to the present disclosure.
Figure 7A:
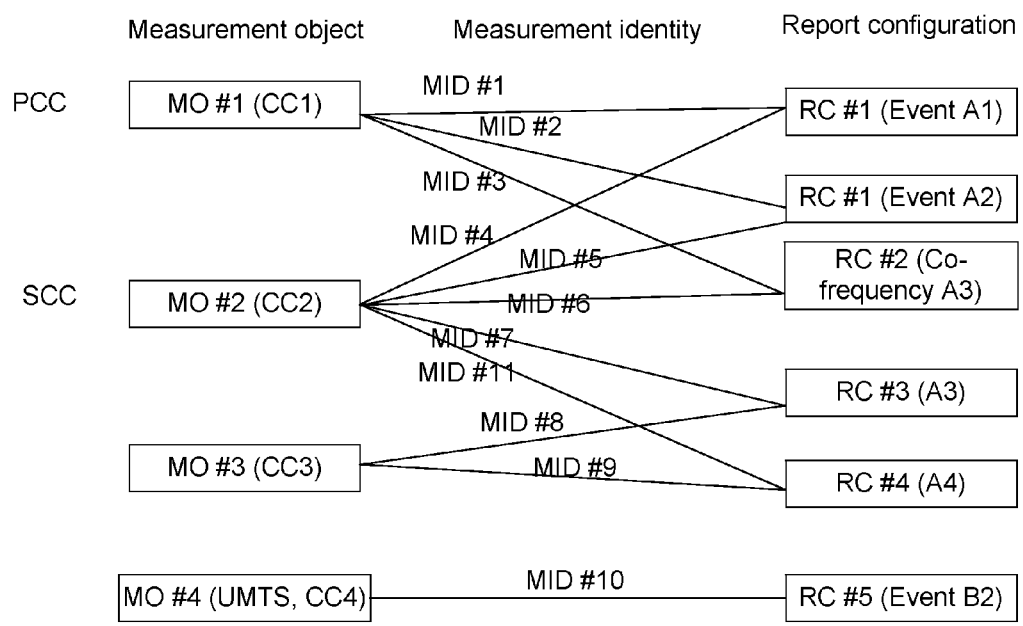
FIG. 7a is a schematic diagram showing a process of a measurement task processing before the reconstruction shown in FIG. 6 according to the present disclosure.

FIG. 6 is a schematic diagram showing a reconstruction of an UE from a cell 1 to a cell 2 according to the present disclosure, as shown in FIG. 6, the UE resides on a CC1 and initiates the establishment of a RRC connection on the CC1, accesses a carrier aggregation cell 1 after finishing the establishment of the RRC connection and then enters into a connected state, wherein the CC1 is a PCC and a Pcell is the serving cell at CC1. Due to the demand on services, a network side configures a CC2 for the UE to carry out a carrier aggregation, therefore, the component carriers synchronously used currently by the UE are the CC1 and the CC2, wherein the CC1 is the PCC, the CC2 is the SCC, and the Scell is the serving cell at the CC2. FIG. 7a is a schematic diagram showing a measurement task processing before the reconstruction shown in FIG. 6 according to the present disclosure, as shown in FIG. 7a, the content of the measurement task before the handover includes: MID#1-3, wherein the carrier frequency of the measurement object is the carrier frequency on which there is the CC1 (i.e., PCC), and the measurement event is A1/A2/co-frequency A3 which may be determined as that described in the embodiment 1 and may belong to the measurement task related to the Pcell; MID#4-6, wherein the measurement object is a carrier frequency CC2, that is, the carrier frequency on which there is the SCC, and measurement event is A1/A2/co-frequency A3 which may be determined as that described in the embodiment 1 and may belong to the measurement tasks related to the Scell; and MID#7-11, which can be determined, by an analogue determination, to be the measurement task related to the Pcell, wherein when performing the report, MID#11 is required to carry a measurement quantity related to the Pcell.

The UE needs to initiate a RRC reconstruction when an RLF occurs in the carrier aggregation cell 1. The UE first carries out a cell selection and selects a carrier aggregation cell 2 on a CC3 which is the only carrier frequency used in the carrier aggregation cell 2. The CC3 is the PCC, and the Pcell is the serving cell on the CC3. At this moment, the UE deletes the Scell at the source side by oneself, and/or deletes the measurement tasks (MID#4-6) related to the Scell, or carries out a processing after receiving a reconstruction message from a target side. Then, the UE imitates a RRC reconstruction request to the target side.

Figure 7B:
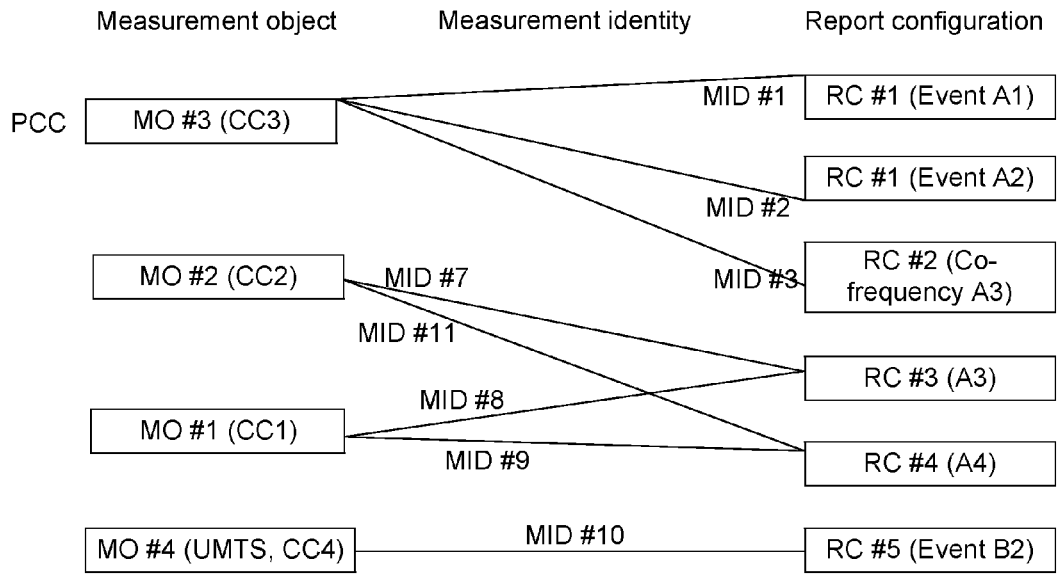
FIG. 7b is a schematic diagram showing a process of a measurement task processing during the reconstruction shown in FIG. 6 according to the present disclosure.

FIG. 7b is a schematic diagram showing a measurement task processing during the process of the reconstruction shown in FIG. 6 according to the present disclosure, as shown in FIG. 7b, after receiving a RRC reconstruction request message from the UE, the target side determines not to configure a CC2 for the UE, therefore, according to the rule for the measurement task processing set in the disclosure, the measurement tasks (MID#4-6) related to the Scell on the CC2 of the source side are deleted.

An S-Pcell (source side Pcell) and a T-Pcell (target side Pcell) are on different frequencies and the measurement object is the frequency (CC3) on which there is the Pcell, the following processing is carried out for all measurement tasks (MID#1-3, and MID#7-11): for a measurement object corresponding to a measurement task (e.g., MID#1/2/3) which is the frequency (CC1) on which there is the S-Pcell, modifying the measurement object to a measurement object (MO#3) of the frequency on which there is the T-Pcell; and for a measurement object corresponding to a measurement task (e.g., MID#8/9) which is the frequency (CC3) on which there is the T-Pcell, modifying the measurement object to a measurement object (MO#1) of the frequency on which there is the S-Pcell. Other measurement task, such as the measurement task (MID#10) of the CC4, is kept.

As the CC2 is not configured for the UE by the target side, according to the rule for the measurement task processing set in the disclosure, and the measurement tasks (MID#4-6) related to the Scell on the CC2 of the source side are deleted, but other measurement tasks (MID#7, and MID#11) which are related to the Scell and for which the carrier frequency of the measurement object is the CC2 are kept. Other measurement task, such as the measurement task (MID#10) of the CC4, is kept.

The target side responds a reconstruction command to the UE, and after receiving it, the UE may delete the measurement tasks (MID#4-6) related to the Scell and may further delete the Scells at the source side by oneself.

For a measurement object corresponding to a measurement task (e.g., MID#1/2/3) which is the frequency (CC1) on which there is the S-Pcell, the measurement object is modified to a measurement object (MO#3) of the frequency on which there is the T-Pcell, and for a measurement object corresponding to a measurement task (e.g., MID#8/9) which is the frequency (CC3) on which there is the T-Pcell, the measurement object is modified to a measurement object (MO#1) of the frequency on which there is the S-Pcell. The other measurement tasks (MID#7, MID#11) are kept the measurement object of which is the source side Scell (the SCC is the CC2). The other measurement tasks, such as the measurement task (MID#10) of the CC4, are kept. A reconstruction completion command is returned to the target side.

Figure 7C:
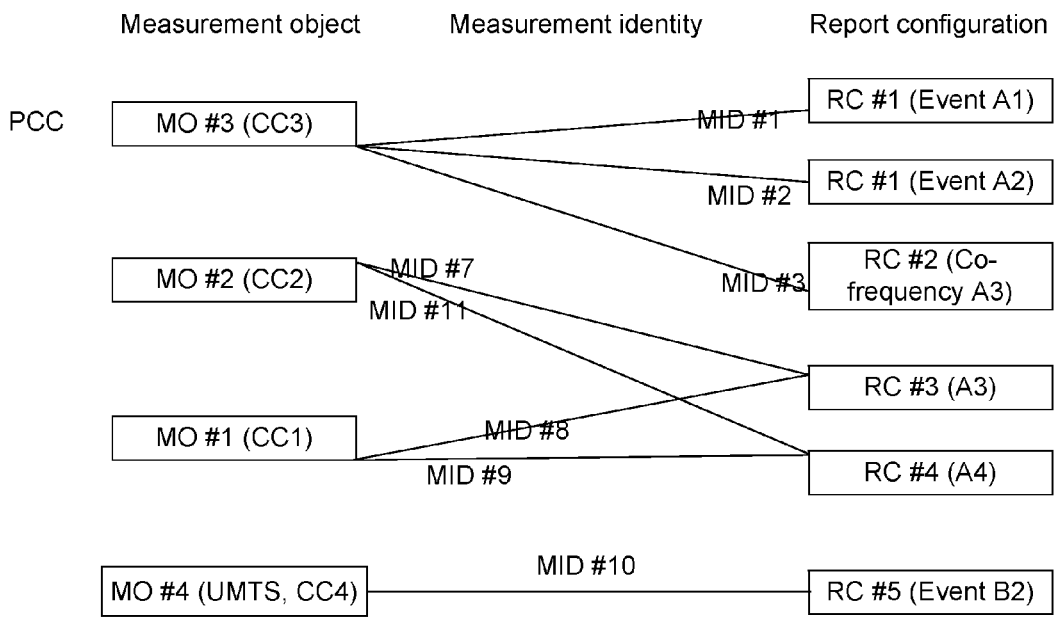
FIG. 7c is a schematic diagram showing a process of a measurement task processing after the reconstruction shown in FIG. 6 according to the present disclosure.

According to the result shown in FIG. 7b, the target side configures the delta signaling of a measurement task for the UE, the final measurement task result is shown in FIG. 7c; the target side sends the delta signaling to the UE through a RRC reassignment message. The UE carries out the measurement task configuration in the delta signaling, and the final measurement task result is the same as that shown in FIG. 7c.

If the signal quality of the Scell is required to be reported, then the measurement task of MID #11 belongs to an Scell-related measurement task and can therefore be deleted during the reconstruction process shown in FIG. 7b.

Embodiment 3

Figure 8:
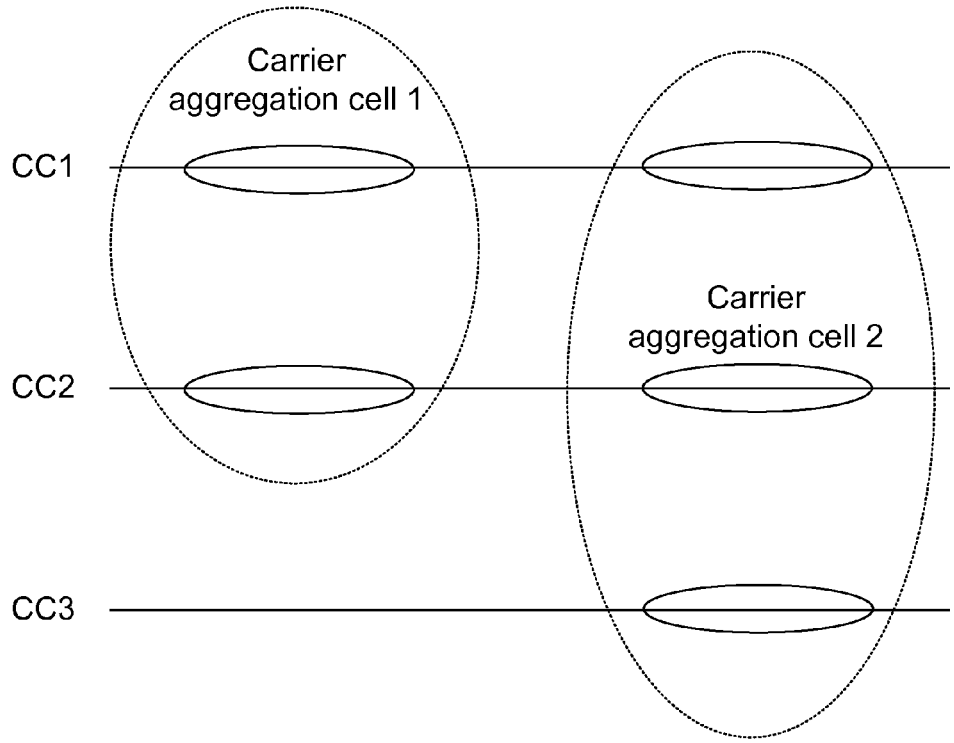
FIG. 8 is a schematic diagram showing a handover of an UE from a cell 1 to a cell 2 according to the present disclosure.

FIG. 8 is a schematic diagram showing a handover of an UE from a cell 1 to a cell 2 according to the present disclosure, as shown in FIG. 8, the UE resides on a CC1 and initiates the establishment of a RRC connection at the CC1, accesses a carrier aggregation cell 1 after finishing the establishment of the RRC connection and then enters into a connected state. At this moment, the CC1 is a PCC, and a Pcell is the serving cell on the CC1. Due to the demand on services, a network side configures CC2 for the UE to carry out a carrier aggregation, therefore, the component carriers synchronously used currently by the UE are the CC1 and the CC2, wherein the CC1 is the PCC, the CC2 is the SCC, and the Scell is the serving cell on the CC2.

Figure 9A:
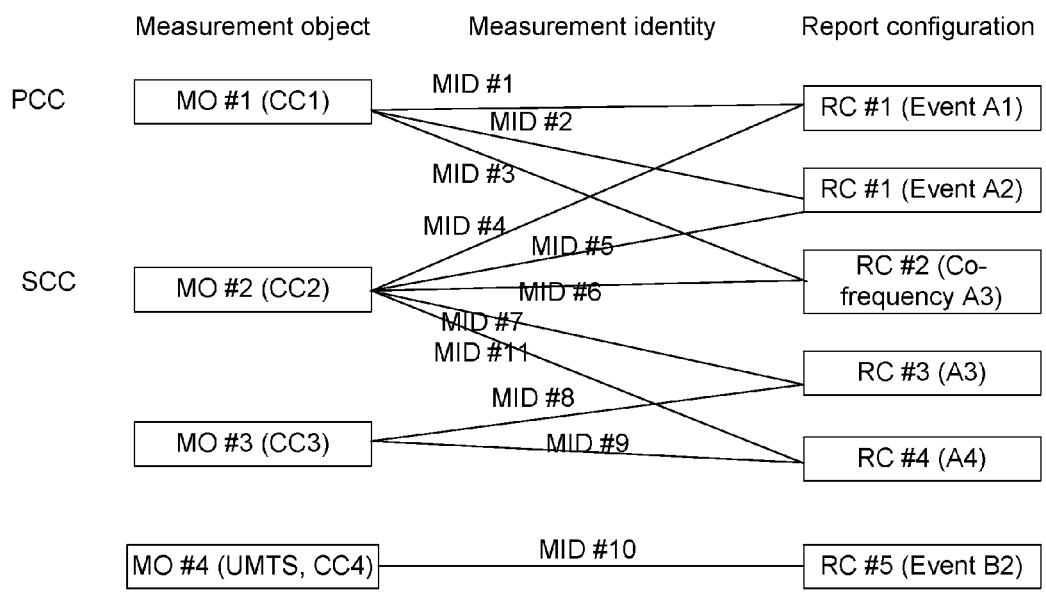
FIG. 9a is a schematic diagram showing a process of a measurement task processing before the reconstruction shown in FIG. 8 according to the present disclosure.

As shown in FIG. 9a, the UE moves towards a carrier aggregation cell 2, the source base station determines to perform a handover to the target base station, namely the handover of the UE to the carrier aggregation cell 2. The handover request message sent by the source base station to the target base station contains the measurement task of the UE in the source base station, and may further contain information of the carriers currently used by the UE, such as information of an S-CC1 and an S-CC2, wherein the CC1 is information such as a PCC and the like.

Figure 9B:
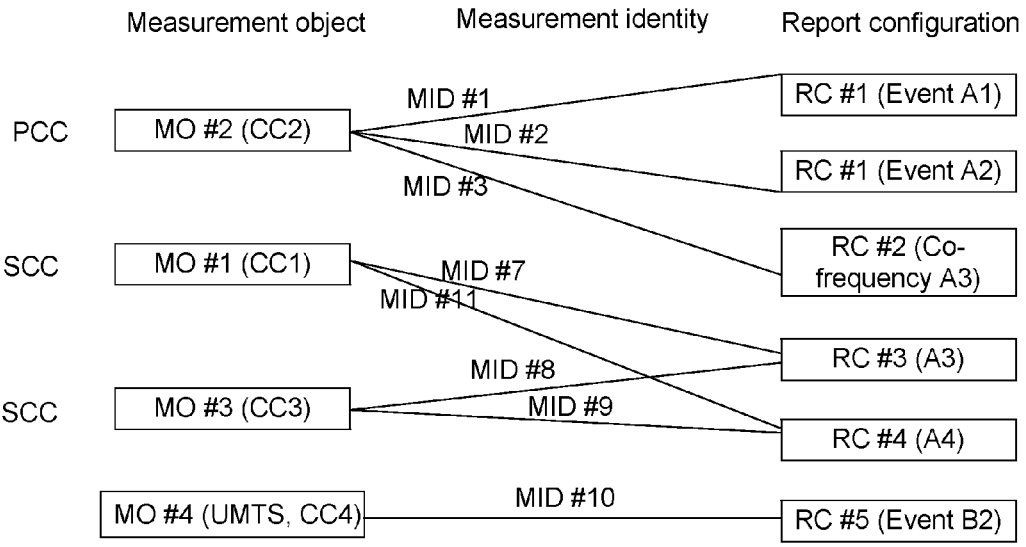
FIG. 9b is a schematic diagram showing a process of a measurement task processing during the reconstruction shown in FIG. 8 according to the present disclosure.

As shown in FIG. 9b, after receiving the handover request message from the source base station, the target base station determines to configure the CC1, the CC2 and the CC3 in the carrier aggregation cell 2 for the UE, wherein the CC2 is the PCC. Although the target side has configured the CC2 for the UE, as the CC2 is the PCC, there is not the target side Scell of which the carrier frequency is the CC2, the Scell-related measurement tasks (MID#4/5/6) on the CC2 of the source side should be deleted. The other measurement tasks are kept.

An S-Pcell (source side Pcell) and a T-Pcell (target side Pcell) are on different frequencies and the measurement object is the frequency (CC2) on which there is the target Pcell, the following processing is carried out for all measurement tasks (MID#1/2/3, and MID#7-11): for a measurement object corresponding to a measurement task (e.g., MID#1/2/3) which is the frequency (CC1) on which there is the S-Pcell, modifying the measurement object to a measurement object (MO#2) of the frequency on which there is the T-Pcell; and for a measurement object corresponding to a measurement task (e.g., MID#7/11) which is the frequency (CC2) on which there is the T-Pcell, modifying the measurement object to a measurement object (MO#1) of the frequency on which there is the S-Pcell.

The measurement tasks (MID#8/9) of the other carrier frequencies (except the primary carrier frequency and the secondary carrier frequency) are kept.

During the process above, as the original Pcell becomes an Scell and the original Scell becomes a Pcell, the measurement tasks (MID#4/5/6) related to the S-Scell can be kept at this moment; the S-Pcell (source side Pcell) and the T-Pcell (target side Pcell) are on different frequencies, and the frequency (CC2) on which there is the target Pcell is the measurement object, the following processing is carried out for all measurement tasks (MID#1/2/3, and MID#4/5/6/7-11): for a measurement object corresponding to a measurement task (e.g., MID#1/2/3) which is the frequency (CC1) on which there is the S-Pcell, modifying the measurement object to a measurement object (MO#2) of the frequency on which there is the T-Pcell; and for a measurement object corresponding to a measurement task (e.g., MID#4/5/6/7/11) which is the frequency (CC2) on which there is the T-Pcell, modifying the measurement object to a measurement object (MO#1) of the frequency on which there is the S-Pcell.

According to the measurement task processing result above, the target base station configures, for the UE, the delta signaling of a measurement task (for example, configuring MID#4/5), and sends the delta signaling to the source base station through a handover request response message; and after receiving it, the source base station sends it to the UE through a handover command.

After receiving the handover command, the UE deletes the Scell-related measurement tasks (MID#4/5/6) on the CC2 of the source side.

Figure 9C:
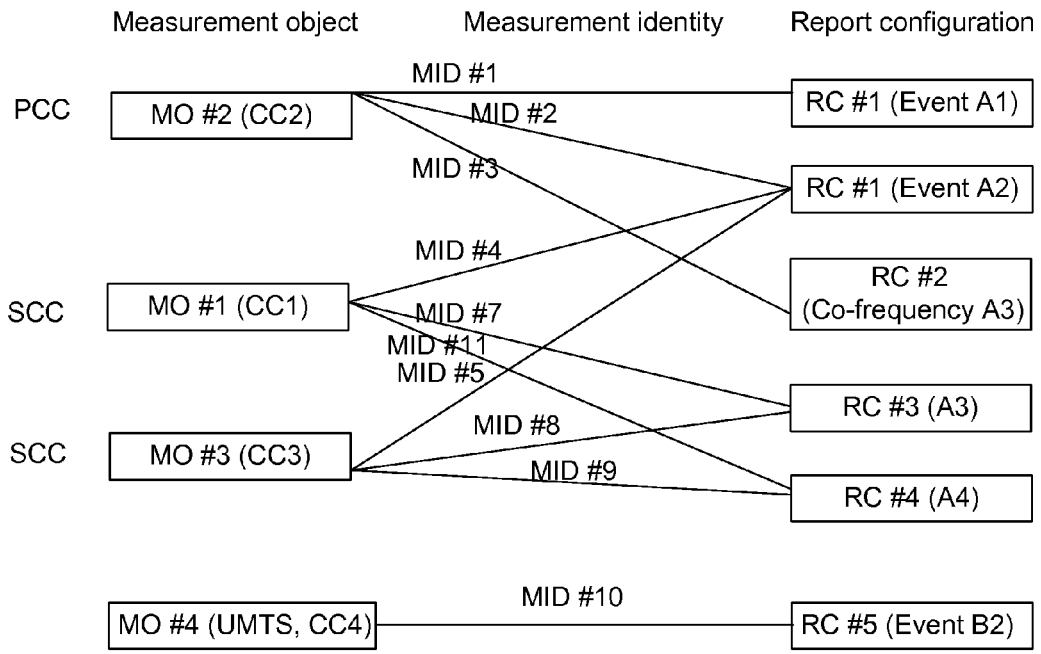
FIG. 9c is a schematic diagram showing a process of a measurement task processing after the reconstruction shown in FIG. 8 according to the present disclosure.

For a measurement object corresponding to a measurement task (e.g., MID#1/2/3) which is the frequency (CC1) on which there is the S-Pcell, the measurement object is modified to a measurement object (MO#2) of the frequency on which there is the T-Pcell, and for a measurement object corresponding to a measurement task (e.g., MID#7/11) which is the frequency (CC2) on which there is the T-Pcell, the measurement object is modified to a measurement object (MO#1) of the frequency on which there is the S-Pcell. The measurement task (MID#8/9) of which the carrier frequency of the measurement object is the target side Scell (the SCC is the CC3) is kept, and the measurement tasks of a CC4 is also kept. Then, the measurement task configuration in the delta signaling is carried out to acquire the final measurement task configuration shown in FIG. 9c.

Embodiment 4

Figure 10:
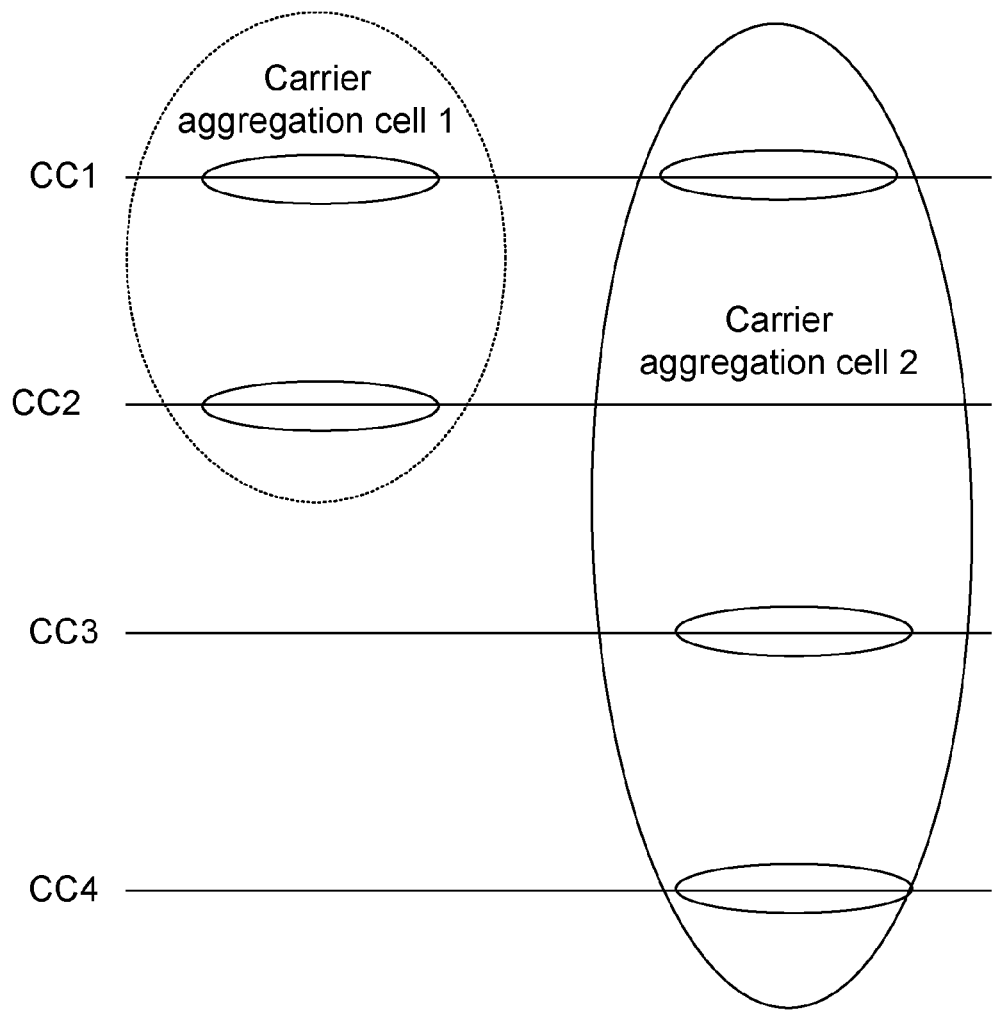
FIG. 10 is a schematic diagram showing a handover of an UE from a cell 1 to a cell 2 according to the present disclosure.

FIG. 10 is a schematic diagram showing a handover of an UE from a cell 1 to a cell 2 according to the present disclosure, as shown in FIG. 10, the UE resides at a CC1 and initiates the establishment of a RRC connection on a CC1, accesses a carrier aggregation cell 1 after finishing the establishment of the RRC connection and then enters into a connected state. At this moment, the CC1 is a PCC, and a Pcell is the serving cell on CC1. Due to the demand on services, a network side configures CC2 for the UE to carry out a carrier aggregation, therefore, the component carriers synchronously used currently by the UE are the CC1 and the CC2, wherein the CC1 is the PCC, the CC2 is the SCC, and the Scell is the serving cell on the CC2.

Figure 11A:
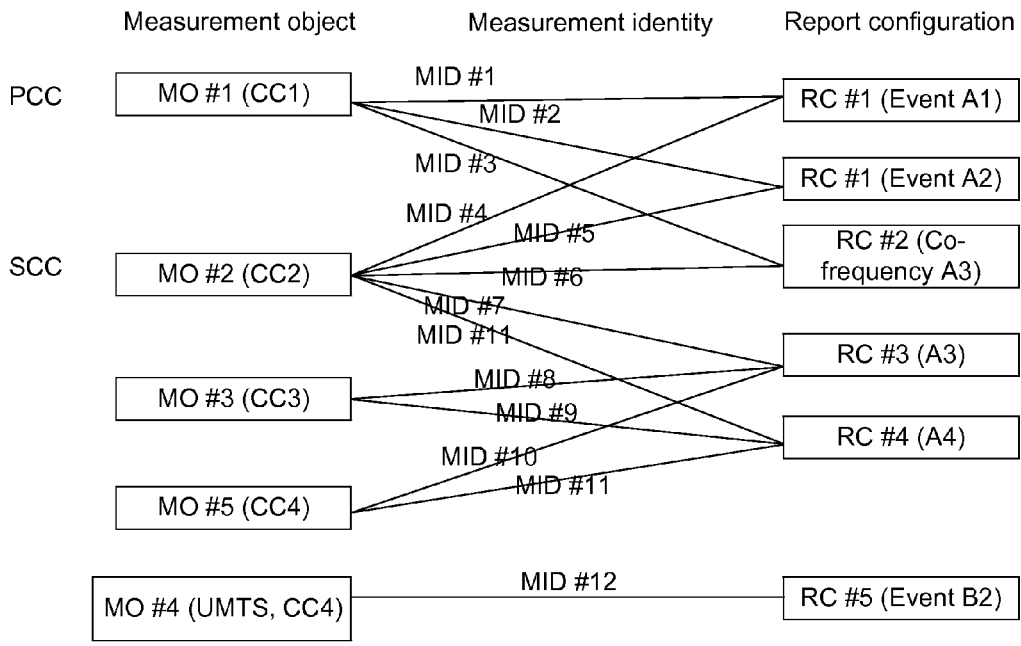
FIG. 11a is a schematic diagram showing a process of a measurement task processing before the reconstruction shown in FIG. 10 according to the present disclosure.

As shown in FIG. 11a, the UE moves towards a carrier aggregation cell 2, the source base station determines to perform a handover to the target base station namely the handover of the UE to the carrier aggregation cell 2. The handover request message sent by the source base station to the target base station contains the measurement task of the UE in the source base station, and may further contain the information on the carriers currently used by the UE, such as the information on a S-CC1 and a S-CC2, wherein the CC1 is information such as a PCC and the like.

After receiving the handover request message from the source base station, the target base station determines to configure the CC1, the CC3 and the CC4 in the carrier aggregation cell 2 for the UE, and indicates that the CC3 is the PCC. As the target side does not configure the CC2 for the UE, the Scell-related measurement task (MID#4/5/6) on the CC2 of the source side is deleted, and as the source side does not configure for the UE the CC4 and CC1 configured at the target side, the measurement tasks (MID#8-11) of which the measurement objects are the CC4 and the CC1 of the target side are kept. The measurement task (MID#12) of the other carrier frequencies (except the primary carrier frequency and the secondary carrier frequency) is kept.

An S-Pcell (source side Pcell) and a T-Pcell (target side Pcell) are on different frequencies and the measurement object is the frequency (CC3) on which there is the target Pcell, the following processing is carried out for all measurement tasks (MID#1/2/3, and MID#7-12): for a measurement object corresponding to a measurement task (e.g., MID#1/2/3) which is the frequency (CC1) on which there is the S-Pcell, modifying the measurement object to a measurement object of the frequency on which there is the T-Pcell; for a measurement object corresponding to a measurement task (e.g., MID#8/9) which is the frequency (CC3) on which there is the T-Pcell, modifying the measurement object to a measurement object of the frequency on which there is the S-Pcell.

Figure 11B:
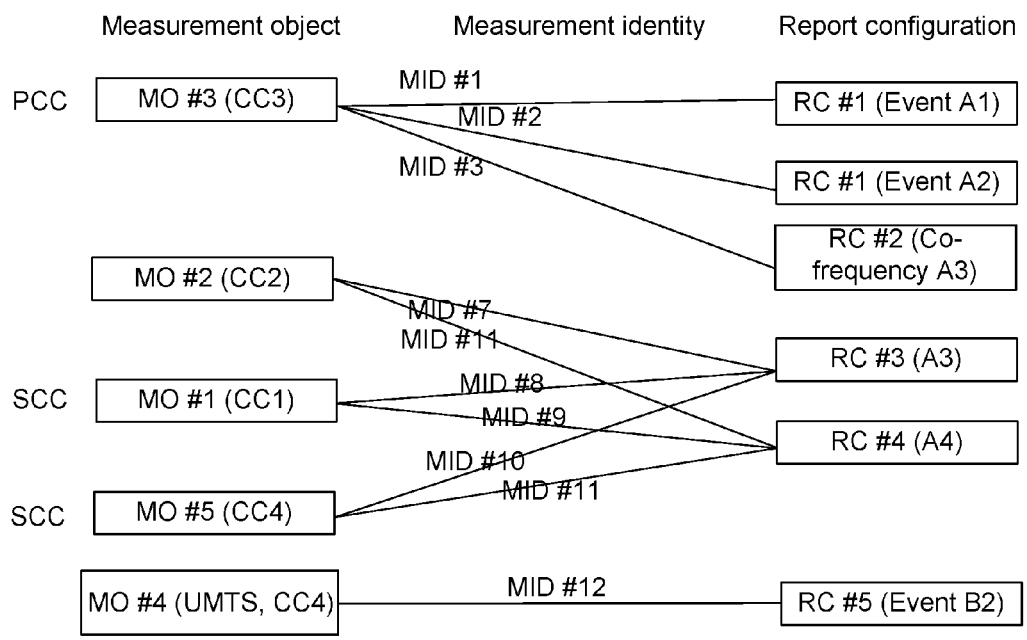
FIG. 11b is a schematic diagram showing a process of a measurement task processing during the reconstruction shown in FIG. 10 according to the present disclosure.

As shown in FIG. 11b, the target base station configures the delta signaling of a measurement task (e.g., increasing a measurement task related to the Scell (the SCC is the CC4 and the CC1) configured at the target side) for the UE according to the processing result of the measurement task. It is sent to the source base station through a handover request response message, and after receiving it, the source base station sends it to the UE through a handover command.

After receiving the handover command, the UE deletes the measurement task (MID#4/5/6) related to the source Scell (the SCC is the CC2).

Figure 11C:
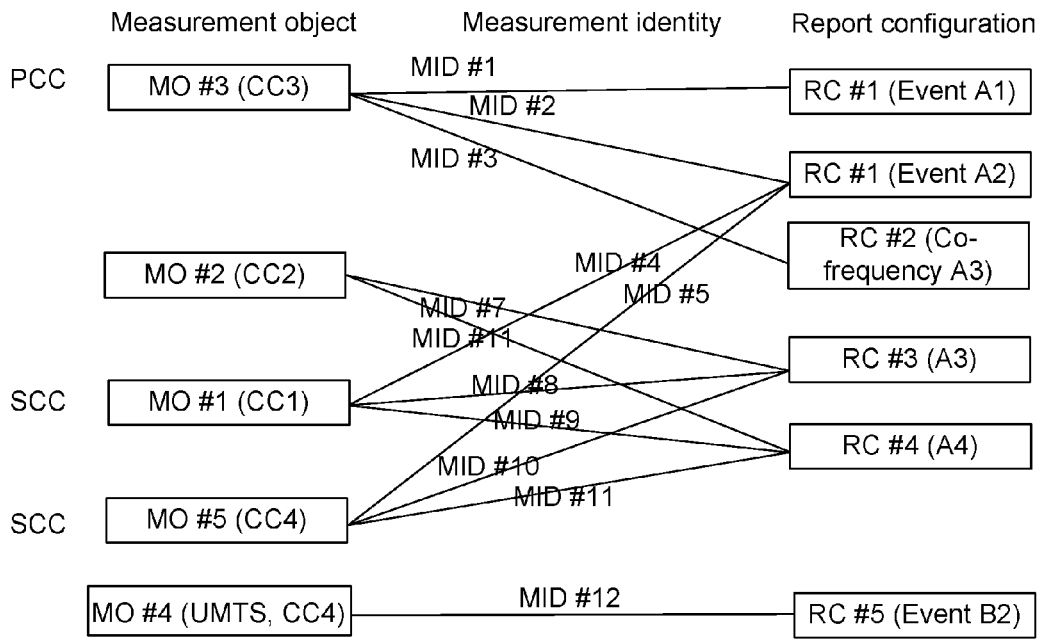
FIG. 11c is a schematic diagram showing a process of a measurement task processing after the reconstruction shown in FIG. 10 according to the present disclosure.

For a measurement object corresponding to a measurement task (e.g., MID#1/2/3) which is the frequency (CC1) on which there is the S-Pcell, the measurement object is modified to a measurement object of the frequency on which there is the T-Pcell, and for a measurement object corresponding to a measurement task (e.g., MID#8/9) which is the frequency (CC3) on which there is the T-Pcell, the measurement object is modified to a measurement object of the frequency on which there is the S-Pcell. The measurement tasks of the Scell (the SCC is the CC4 and the CC1) configured at the target side are kept. The measurement tasks of the other carrier frequencies (except the primary carrier frequency and the secondary carrier frequency) are kept. Then, the measurement task configuration in the delta signaling is carried out and the final measurement task configuration is acquired, as shown in FIG. 11c.

Embodiment 5

FIG. 8 is a schematic diagram showing a handover of an UE from a cell 1 to a cell 2 according to the present disclosure; as shown in FIG. 8, the UE resides on a CC1 and initiates the establishment of a RRC connection on a CC1, accesses a carrier aggregation cell 2 after finishing the establishment of the RRC connection and then enters into a connected state, in this way, according to the rule relevant to the carrier aggregation system, the CC1 is a PCC, and the serving cell on the CC1 is a Pcell. Due to the demand on services, a network side configures a CC2 for the UE to carry out a carrier aggregation, and synchronously informs the UE that the Cell Identify (CI) of the CC2 is 1 and the CC1 may have the CI or not, therefore, the component carriers synchronously used by the current UE are the CC1 and the CC2, wherein the CC1 is a PCC, the CC2 is an SCC, and a Scell is a serving cell on the CC2.

The base station configures, for the UE, a measurement task for which the measurement object is CC1/CC2/CC3.

During the movement process of the UE, the source base station finds that the signal quality of the Scell at the CC2 gets worse and determines to replace the CC2 with a CC3, and synchronously informs the UE that the CI of the CC3 is 1 through a RRC reassignment command, synchronously modifies the measurement object corresponding to the measurement task of the original Scell (on the CC2) to the reassigned target frequency (CC3), and configures the delta signaling of a measurement task configuration for the UE based on the current measurement task configuration.

After receiving the reassignment command, the UE carries out the operation related to the replace of the CC2 with the CC3 and carries out the following processing for the measurement task: modifying the measurement object corresponding to the measurement task of the original Scell (on the CC2) to the reassigned target frequency (CC3) and then carrying out the delta signaling of the measurement task configuration in the RRC reassignment command. At this moment, the measurement task configuration of the UE and the measurement task configuration of the base station are completely consistent.

In the step above, if the source base station determines to replace the CC2 with a CC4 and synchronously informs the UE that the CI of the CC4 is 1 through a RRC reassignment command, deletes the Scell-related measurement task of the original Scell (on the CC2), and configures the delta signaling of a measurement task configuration for the UE based on the current measurement task configuration. After receiving the reassignment command, the UE carries out the operation related to the replace of the CC2 with the CC4 and carries out the following processing for the measurement task: deleting the Scell-related measurement tasks of the original Scell (on the CC2) and then carrying out the delta signaling of the measurement task configuration in the RRC reassignment command. At this moment, the measurement task configuration of the UE and the measurement task configuration of the base station are completely consistent.

Then, the source base station finds that the signal quality of the Scell on the CC3 gets worse and determines to delete the CC3, i.e., delete the Scell having the CI of 1, informs the UE of the deletion through the RRC reassignment command, synchronously deletes the measurement tasks (the RRC reassignment command may contain the MID of the task to be deleted or not) related to the original Scell (at the CC3), and configures the delta signaling of a measurement task configuration for the UE based on the current measurement task configuration.

After receiving the reassignment command, the UE deletes the CC3 and carries out the following processing for the measurement task: deleting the measurement tasks related to the original Scell (on the CC3) and then carrying out the delta signaling of the measurement task configuration in the RRC reassignment command. At this moment, the measurement task configuration of the UE and the measurement task configuration of the base station are completely consistent.

Embodiment 6

Figure 12:
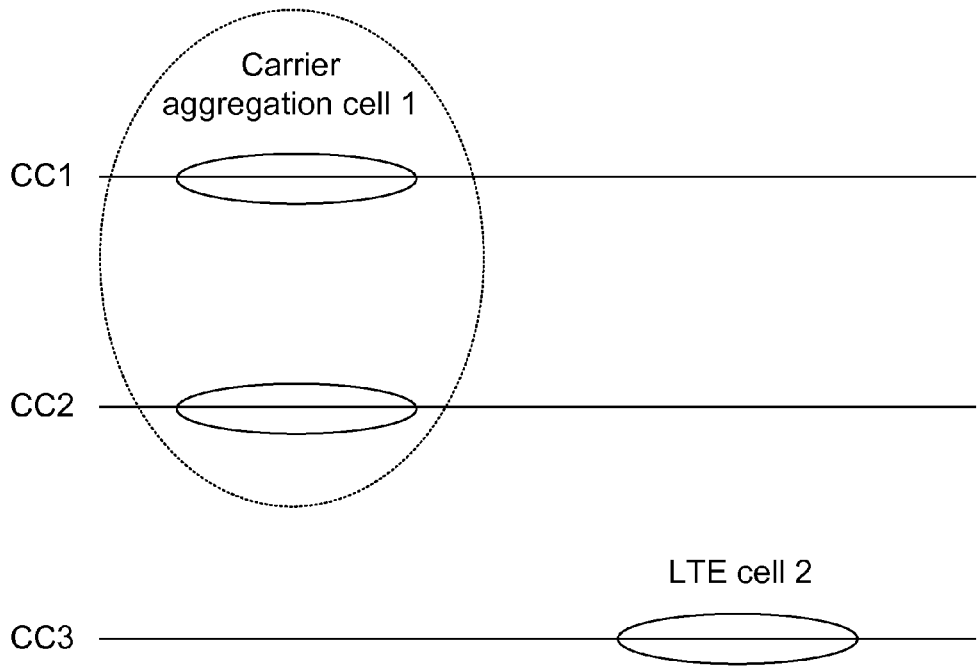
FIG. 12 is a schematic diagram showing a handover of an UE from a cell 1 to a cell 2 according to the present disclosure.

As shown in FIG. 12, an UE resides on a CC1 and initiates the establishment of a RRC connection on the CC1, accesses a carrier aggregation cell 1 after finishing the establishment of the RRC connection and then enters into a connected state, the CC1 is a PCC, and a Pcell is a serving cell on the CC1. Due to the demand on services, a network side configures a CC2 for the UE to carry out a carrier aggregation, therefore, the component carriers synchronously used by the current UE are the CC1 and the CC2, wherein the CC1 is the PCC, the CC2 is an SCC, and the Scell is the serving cell on the CC2. The carrier aggregation cell 1 belongs to a base station 1 and is a base station of an LTE-A.

The UE moves towards an LTE cell 2 which belongs to a base station 2 and is a base station of an LTE. The source base station determines to make a handover to the target base station and performs the handover of the UE to the LTE cell 2 using a CC3. As the target base station is an LTE system, the target base station supports only one carrier and processes the measurement task by employing a processing principle used in the LTE system. Therefore, the source base station informs the UE to delete the SCC while sending a handover request message to the target base station, or informs the UE to delete the SCC through a handover command. After receiving the handover command, the UE deletes the SCC automatically (if the deletion of the SCC is not explicitly informed in the handover command, the UE can delete the SCC by himself), and synchronously the UE automatically deletes the Scell-related measurement task on the SCC (CC2) or the source base station notifies the UE through a RRC signaling to delete the Scell-related measurement task on the SCC (CC2), or the UE automatically deletes the measurement task for which the measurement object is the frequency point on which there is the SCC (CC2) or the source base station notifies the UE through a RRC signaling to delete the measurement task for which the measurement object is the frequency point on which there is the SCC (CC2), in this way, the UE uses only one carrier, i.e., the CC1. At this moment, the handover request message sent by the source base station to the target base station contains the measurement tasks of the UE in the source base station (at this moment, the measurement tasks related to the SCC have been deleted, but the Pcell-related measurement task for which the carrier frequency of the measurement object is the frequency point on which there is the SCC are kept, or the measurement tasks for which the carrier frequencies of the measurement objects are the SCC are all deleted), and may further contain information on the carrier (e.g., S-CC1) currently used by the UE.

After the target base station receives the handover request message from the source base station, an S-Pcell (source side Pcell) and a T-Pcell (target side Pcell) are on different frequencies, and the frequency (CC3) on which there is the target Pcell is the measurement object, the following processing is carried out for the measurement tasks related to the S-Pcell: for the measurement object corresponding to the measurement task which is the frequency (CC1) on which there is the S-Pcell, modifying the measurement object to the measurement object of the frequency on which there is the T-Pcell; and for the measurement object corresponding to the measurement task which is the frequency (CC3) on which there is the T-Pcell, modifying the measurement object to the measurement object of the frequency on which there is the S-Pcell. The measurement tasks of the other carrier frequencies (except the primary carrier frequency and the secondary carrier frequency) are kept.

The target base station configures the delta signaling of a measurement task for the UE based on the result of the measurement task processing above. The target base station sends the delta signaling to the source base station through a handover request response message, and after receiving it, the source base station sends it to the UE through a handover command.

After receiving the handover command by the UE, for a measurement object corresponding to a measurement task which is the frequency (CC1) on which there is the S-Pcell, the measurement object is modified to a measurement object of the frequency on which there is the T-Pcell, and for a measurement object corresponding to a measurement task which is the frequency (CC3) on which there is the T-Pcell, the measurement object is modified to a measurement object of the frequency on which there is the S-Pcell, and the measurement tasks of the other carrier frequencies (except the primary carrier frequency and the secondary carrier frequency) are kept. Then, the measurement task configuration in the delta signaling is carried out to acquire the final measurement task configuration.

Embodiment 7

Figures 13, 14:
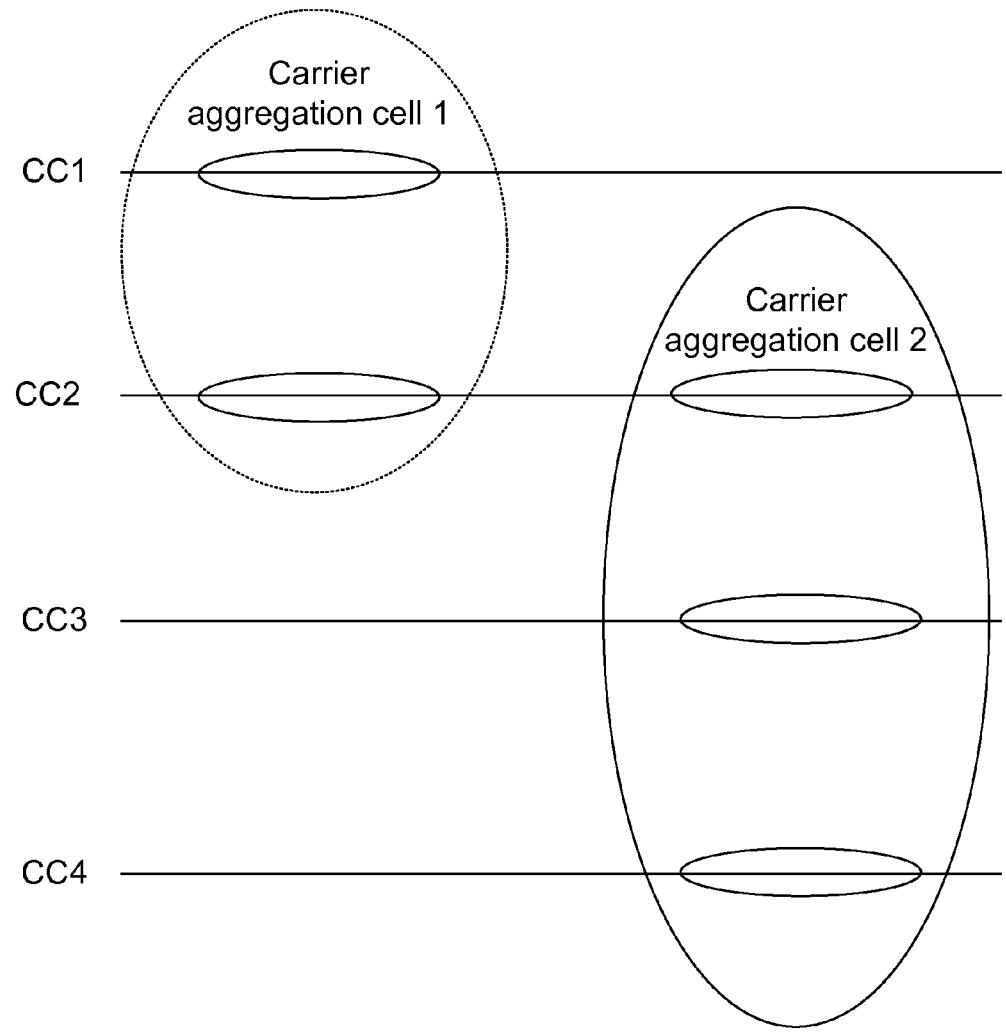
FIG. 13 is a schematic diagram showing a handover of an UE from a cell 1 to a cell 2 according to the present disclosure.
FIG. 14 is a structural diagram of a system for processing a measurement task in a carrier aggregation system according to embodiment 1 of the present disclosure.

FIG. 13 is a schematic diagram showing a reconstruction of an UE from a cell 1 to a cell 2 according to the present disclosure, as shown in FIG. 13, the UE resides on a CC1, initiates the establishment of a RRC connection on the CC1, accesses a carrier aggregation cell 1 after finishing the establishment of the RRC connection, and then enters into a connected state, the CC1 is a PCC, and a Pcell is a serving cell on the CC1. Due to the demand on services, a network side configures a CC2 for the UE to carry out a carrier aggregation, therefore, the component carriers synchronously used by the current UE are the CC1 and the CC2, wherein the CC1 is the PCC, CC2 is an SCC, and the Scell is the serving cell on the CC2.

When the UE moves towards a carrier aggregation cell 2, the source base station determines to perform a handover to the target base station and performs the handover of the UE to the carrier aggregation cell 2, and the CC2, the CC3 and the CC4 are configured, wherein the CC3 is the PCC. The handover request message sent by the source base station to the target base station contains the measurement task of the UE in the source base station, and may further contain information of the carriers currently used by the UE, such as the information of an S-CC1 and an S-CC2, wherein the CC1 is information such as a PCC and the like.

After receiving the handover request message from the source base station, the target base station deletes the measurement tasks for which the carrier frequencies of the measurement objects are the frequency point on which there is the source side SCC (i.e., the CC2), and deletes the measurement task for which the carrier frequency of the measurement object is the frequency point on which there is the target side SCC (i.e., the CC2 and the CC4); for the measurement object corresponding to the measurement task which is the frequency (the CC1) on which there is the S-Pcell, the measurement object is modified to a measurement object of the frequency on which there is the T-Pcell, and for the measurement object corresponding to the measurement task which is the frequency (the CC3) on which there is the T-Pcell, the measurement object is modified to the measurement object of the frequency on which there is the S-Pcell. The measurement tasks of the other carrier frequencies (except the primary carrier frequency and the secondary carrier frequency) are kept.

The target base station configures the delta signaling of a measurement task for the UE based on the result of the measurement task processing above. The target base station sends it to the source base station through a handover request response message, and after receiving it, the source base station sends it to the UE through a handover command.

After receiving the handover command, the UE deletes the measurement task of which the carrier frequency of the measurement object is the frequency point on which there is the source side SCC (i.e., the CC2), and deletes the measurement task for which the carrier frequency of the measurement object is the frequency points on which there are the target side SCCs (i.e., the CC2 and the CC4); for the measurement object corresponding to the measurement task which is the frequency (the CC1) on which there is the S-Pcell, the measurement object is modified to a measurement object of the frequency on which there is the T-Pcell; and for the measurement object corresponding to the measurement task which is the frequency (the CC3) on which there is the T-Pcell, the measurement object is modified to a measurement object of the frequency on which there is the S-Pcell. The measurement task of the CC4 is kept, and then the measurement task configuration in the delta signaling is carried out to acquire the final measurement task configuration.

During the process above, as the source side SCC (i.e., the CC2) and one of the target side SCCs (i.e., the CC2 and the CC4) are on the same carrier frequency (i.e., the CC2), the measurement task for which the carrier frequency of the measurement object is the source side SCC (i.e., the CC2) is kept and only the measurement task for which the carrier frequency of the measurement object is the target side SCC (i.e., the CC4) is deleted, and the actions of the UE and the network side are consistent. The target base station configures the delta signaling of a measurement task for the UE according to the result of the measurement task processing above.

FIG. 14 is a structural diagram of a system for processing a measurement task in a carrier aggregation system according to embodiment 1 of the present disclosure, as shown in FIG. 14, the system for processing the measurement task in the carrier aggregation system according to the disclosure includes:

a deletion unit 140 configured to delete all measurement tasks related to a source Scell; or to delete a measurement task related to an Scell in a deleted source Scell.

Figure 15:
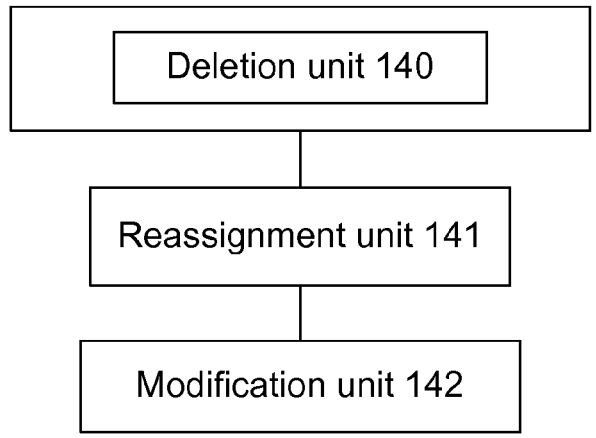
FIG. 15 is a structural diagram of a system for processing a measurement task in a carrier aggregation system according to embodiment 2 of the present disclosure.

FIG. 15 is a structural diagram of a system for processing a measurement task in a carrier aggregation system according to embodiment 2 of the present disclosure, on the basis of the system shown in FIG. 14, the system provided in this embodiment further includes a reassignment unit 141 and a modification unit 142, wherein the reassignment unit 141 is configured to reassign a source Scell to another frequency on which there is a measurement object, the deletion unit does not delete the measurement task related to the reassigned source Scell; and the modification unit 142 is configured to modify a measurement object corresponding to the measurement task related to the source Scell to a measurement object of the reassigned frequency.

The process above in which the source Scell is deleted includes that:

after the configuration, there is not a new Scell which has the same frequency with the deleted source Scell; or there is not a carrier identity corresponding to a source serving cell Scell.

The process in which the source Scell is reassigned to another frequency on which there is the measurement object includes that:

the carrier identity of the source Scell is unchanged and the frequency of the source Scell is changed.

The above modification unit 142 is further configured to: when a measurement object configured by the source base station for an UE contains the carrier frequency of a new Pcell and a measurement object related to a measurement task is a frequency on which there is the target Pcell, modify a corresponding measurement object to a measurement object of the frequency on which there is the new Pcell; and when the measurement object corresponding to the measurement task is the frequency on which there is the source Pcell, modify the measurement object to a measurement object of the frequency on which there is the new Pcell; otherwise, delete the measurement task corresponding to the frequency on which there is the source Pcell. Wherein the source Pcell and the target Pcell are on different frequencies.

Figure 16:
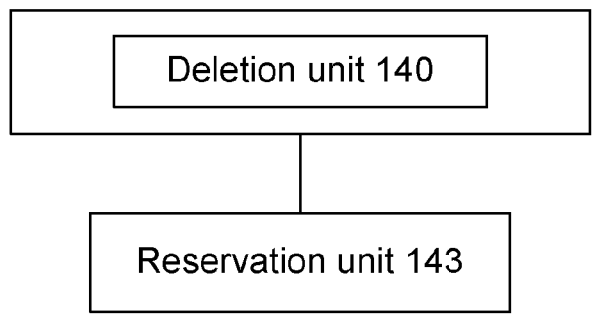
FIG. 16 is a structural diagram of a system for processing a measurement task in a carrier aggregation system according to embodiment 3 of the present disclosure.

FIG. 16 is a structural diagram of a system for processing a measurement task in a carrier aggregation system according to embodiment 3 of the present disclosure, on the basis of the system shown in FIG. 14, the system for processing the measurement task in the carrier aggregation system provided in this embodiment further includes:

a reservation unit 143 configured to keep the measurement task when there is a measurement task for which the measurement object is a carrier frequency exclusive of the source primary carrier frequency and the secondary carrier frequency.

Figure 17:
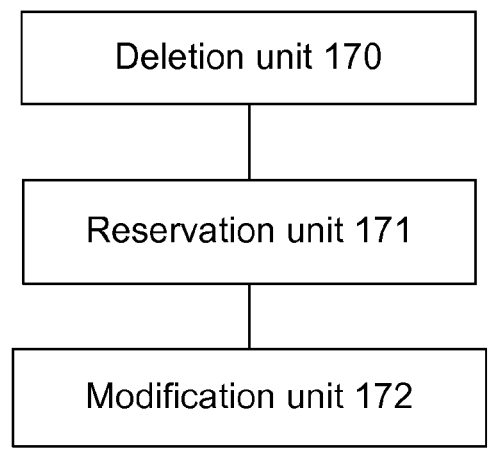
FIG. 17 is a structural diagram of a system for processing a measurement task in a carrier aggregation system according to embodiment 4 of the present disclosure.

FIG. 17 is a structural diagram of a system for processing a measurement task in a carrier aggregation system according to embodiment 4 of the present disclosure, as shown in FIG. 17, the system for processing the measurement task in the carrier aggregation system includes a deletion unit 170, a reservation unit 171 and a modification unit 172, wherein the deletion unit 170 is configured to delete a measurement task for which the measurement object is the frequency on which there is a source side Scell and/or a target side Scell;

the reservation unit 171 is configured to: for the same secondary carrier frequency as the frequency on which there are the source side Scell and the target side Scell, keep the measurement task of which the measurement object is the same secondary carrier frequency; and the modification unit 172 is configured to: when a frequency on which there is a target Pcell is the measurement object, modify the measurement object of a measurement task to a measurement object of the frequency on which there is the target Pcell for the measurement task of which the measurement object is the carrier frequency on which there is the source side Pcell, and modify the measurement object to a measurement object of the frequency on which there is a source Pcell for the measurement task for which the measurement object is the carrier frequency on which there are the target Pcells; wherein the source Pcell and the target Pcell are on different frequencies.

Figure 18:
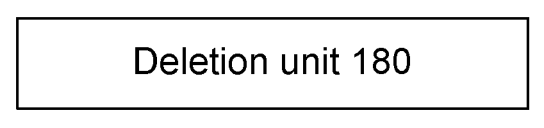

FIG. 18 is a structural diagram of a system for processing a measurement task in a carrier aggregation system according to embodiment 5 of the present disclosure, as shown in FIG. 18, the system for processing a measurement task in a carrier aggregation system according to the disclosure includes:

a deletion unit 180 configured to, when a Scell is deleted, delete a measurement task related to the Scell, or delete a measurement task for which a measurement object is a carrier frequency on which there is the Scell.

It should be appreciated by those skilled in the art that, the system for processing the measurement task in the carrier aggregation system according to the disclosure is devised for the aforementioned method for processing the measurement task in the carrier aggregation system according to the disclosure, and the function of each processing unit above can be understood by reference to related descriptions given in the aforementioned embodiments 1-7. The function of each processing unit shown in the accompanying drawings can be implemented either by a program running in a processor or by a specific logic circuit.

All those described above are merely preferred embodiments of the present disclosure but are not limitation to the scope of the disclosure.

What is claimed is:

1. A method for processing a measurement task in a carrier aggregation system, comprising:
   deleting, by a network element, a measurement task related to a Secondary Cell (Scell) in a deleted source Scell,
   when the measurement object configured by the source base station for an UE contains the carrier frequency of a new Primary Cell (Pcell) and the measurement object related to the measurement task is the frequency on which there is a target Pcell, modifying a corresponding measurement object to a measurement object of the frequency on which there is a new Pcell; and if the measurement object related to the measurement task is the frequency on which there is the source Pcell, modifying the measurement object to a measurement object of the frequency on which there is the new Pcell; otherwise, deleting the measurement task corresponding to the frequency on which there is the source Pcell; wherein the source Pcell and the target Pcell are on different frequencies.

2. The method according to claim 1, wherein the network element comprises at least one of a User Equipment (UE) and a base station.

3. The method according to claim 1, wherein an operation of deleting the source Scell is performed during a process of reassignment/handover/reconstruction.

4. The method according to claim 1, further comprising:
   if the source Scell is reassigned to another frequency on which there is a measurement object, modifying the measurement object corresponding to the measurement task related to the source Scell to a measurement object of the reassigned frequency, instead of deleting the measurement task related to the source Scell;
   otherwise, deleting the measurement task related to the source Scell.

5. The method according to claim 1, wherein the source Scell is deleted in the cases that there is no new Scell on the same frequency as a frequency on which there is the deleted source Scell after configuration, or there is no carrier identity corresponding to the source Scell.

6. The method according to claim 5, further comprising:
   when the measurement object configured by the source base station for an UE contains the carrier frequency of a new Primary Cell (Pcell) and the measurement object related to the measurement task is the frequency on which there is a target Pcell, modifying a corresponding measurement object to a measurement object of the frequency on which there is a new Pcell; and if the measurement object related to the measurement task is the frequency on which there is the source Pcell, modifying the measurement object to a measurement object of the frequency on which there is the new Pcell; otherwise, deleting the measurement task corresponding to the frequency on which there is the source Pcell; wherein the source Pcell and the target Pcell are on different frequencies.

7. The method according to claim 6, further comprising:
   carrying out no processing on the measurement tasks of the Pcell and the Scell when the source Pcell becomes an Scell and the source Scell becomes a Pcell.

8. The method according to claim 1, wherein the source Scell is reassigned to another frequency on which there is a measurement object by changing the frequency of the source Scell with a carrier identity of the source Scell unchanged.

9. The method according to claim 1, further comprising:
   carrying out no processing on the measurement tasks of the Pcell and the Scell when the source Pcell becomes an Scell and the source Scell becomes a Pcell.

10. A system for processing a measurement task in a carrier aggregation system, comprising:
    a deletion unit configured to delete all measurement tasks related to a source Secondary Cell (Scell),
    or delete a measurement task related to an Scell in a deleted source Scell,
    wherein the system further comprises:
    a reassignment unit, configured to reassign the source Scell to another frequency on which there is a measurement object; accordingly, the deletion unit does not delete the measurement task related to the reassigned source Scell; and
    a modification unit, configured to modify the measurement object corresponding to the measurement task related to the source Scell to the measurement object of the reassigned frequency;
      wherein the modification unit is further configured to: modify, when the measurement object configured to the source base station for an UE contains a carrier frequency of a new Primary Cell (Pcell) and the measurement object related to the measurement task is a frequency on which there is a target Pcell, a corresponding measurement object to a measurement object of the frequency on which there is a new Pcell; and modify the measurement object to the measurement object related to the measurement task is the carrier frequency on which there is a source Pcell; otherwise, delete the measurement talk corresponding to the frequency on which there is the source Pcell; wherein the source Pcell and the target Pcell are on different frequencies;
    each of the deletion unit, the reassignment unit, and the modification unit comprising a computer processor and respective memory, the respective memory storing computer-readable instructions which when executed by the computer processor implement the functions of the said units.

11. The system according to claim 10, wherein a process in which the source Scell is deleted comprises that:
    there is not a new Scell on the same frequency as a frequency on which there is the deleted source Scell after the configuration; or
    there is not a carrier identity corresponding to a source secondary serving cell Scell.

12. The system according to claim 10, wherein the source Scell is reassigned to the another frequency on which there is a measurement object by changing the frequency of the source Scell with the carrier identity of the source Scell unchanged.

* * * * *